US012431597B2

(12) United States Patent
Kim et al.

(10) Patent No.: US 12,431,597 B2
(45) Date of Patent: Sep. 30, 2025

(54) BATTERY THERMAL RELEASE LAYER

(71) Applicant: Rivian IP Holdings, LLC, Irvine, CA (US)

(72) Inventors: Soo Kim, Fremont, CA (US); Ki Tae Park, Santa Clara, CA (US)

(73) Assignee: Rivian IP Holdings, LLC

( * ) Notice: Subject to any disclaimer, the term of this patent is extended or adjusted under 35 U.S.C. 154(b) by 855 days.

(21) Appl. No.: 17/708,538

(22) Filed: Mar. 30, 2022

(65) Prior Publication Data
US 2023/0318157 A1 Oct. 5, 2023

(51) Int. Cl.
| | |
|---|---|
| *H01M 50/581* | (2021.01) |
| *B60L 50/64* | (2019.01) |
| *B60L 58/10* | (2019.01) |
| *H01M 4/38* | (2006.01) |
| *H01M 4/62* | (2006.01) |
| *H01M 10/42* | (2006.01) |
| *H01M 10/48* | (2006.01) |
| *H01M 4/02* | (2006.01) |

(52) U.S. Cl.
CPC ........... *H01M 50/581* (2021.01); *B60L 50/64* (2019.02); *B60L 58/10* (2019.02); *H01M 4/38* (2013.01); *H01M 4/62* (2013.01); *H01M 10/4235* (2013.01); *H01M 10/425* (2013.01); *H01M 10/48* (2013.01); *H01M 2004/028* (2013.01); *H01M 2010/4271* (2013.01); *H01M 2200/10* (2013.01); *H01M 2220/20* (2013.01)

(58) Field of Classification Search
CPC ........ H01M 50/581; H01M 4/62; H01M 4/38; H01M 10/4235; H01M 10/425; H01M 10/48; B60L 50/64

USPC .......................................................... 320/106
See application file for complete search history.

(56) References Cited

U.S. PATENT DOCUMENTS

| | | | | |
|---|---|---|---|---|
| 2008/0241684 | A1* | 10/2008 | Muraoka | H01M 10/0587 427/58 |
| 2014/0178753 | A1* | 6/2014 | Chu | H01M 4/62 429/211 |
| 2015/0311001 | A1* | 10/2015 | Kato | H01G 11/06 429/217 |
| 2021/0344086 | A1* | 11/2021 | Fan | H01M 50/581 |
| 2022/0363144 | A1* | 11/2022 | Boddakayala | H01M 10/653 |

(Continued)

OTHER PUBLICATIONS

Bresser, et al., "Alternative binders for sustainable electrochemical energy storage—the transition to aqueous electrode processing and bio-derived polymers", Royal Society of Chemistry, Energy Environ. Sci., 2018, 11, 3096-3127, accessed via https://pubs.rsc.org/en/content/articlehtml/2018/ee/c8ee00640g.

(Continued)

*Primary Examiner* — Nathaniel R Pelton
(74) *Attorney, Agent, or Firm* — FOLEY & LARDNER LLP

(57) ABSTRACT

A thermal release layer for electrode materials in a battery cell is provided. The battery cell can include a terminal and an electrode, in contact with the terminal. The battery cell can include a first material that conducts electricity to establish electrical continuity with the terminal. The battery call can include a second material that, in response to a temperature of the electrode reaching or exceeding a temperature threshold, expands to reduce the electrical continuity with the terminal.

18 Claims, 13 Drawing Sheets

(56) References Cited

U.S. PATENT DOCUMENTS

2023/0211704 A1* 7/2023 Moon ................. H01M 50/502
                 701/22

OTHER PUBLICATIONS

Zeon Corporation, Lithium-ion Rechargeable Battery Materials, Energy Materials, accessed Mar. 2022 via https://www.zeon.co.jp/en/business/enterprise/battery/binder/.

* cited by examiner

1100

BATTERY THERMAL RELEASE LAYER

INTRODUCTION

Batteries can be a source of electrical power. Various components or devices can be powered using batteries.

SUMMARY

An electrical device powered by a battery can be attached to the positive and negative terminals of the battery. These terminals, depending on the internal configuration of the battery, can be connected to the anode or cathode of the battery. As anode or cathode chemistries can vary across various kinds of batteries, they can have provided desired battery performance for certain kinds of anode or cathode chemistries. However, the same chemistries that provide desired performance can also affect the sensitivity of the battery to temperature changes. This technology provides a thermal release layer at an electrode of the battery so as to manage the temperature of the battery based on the amount of current flowing through the battery. The thermal release layer of this technology can be located between electrically conducting contacts of a battery. As the temperature of the battery increases, the thermal release layer can expand. The expansion of the thermal release layer can reduce the electrical continuity between the electrically conducting contacts of the battery, thereby reducing the amount of current flowing through the battery and managing the temperature of the battery.

At least one aspect is directed to a battery cell. The battery cell can include a terminal and an electrode in contact with the terminal. The battery cell can include a first material that conducts electricity to establish electrical continuity with the terminal. The battery cell can include a second material that, in response to a temperature of the electrode exceeding a temperature threshold, expands to reduce the electrical continuity with the terminal.

At least one aspect is direct to a method. The method can include providing a battery cell. The battery cell can include a terminal. The battery cell can include an electrode in contact with the terminal. The electrode can include a first material that conducts electricity to establish electrical continuity with the terminal. The electrode can include a second material that, in response to a temperature of the electrode exceeding a temperature threshold, expands to reduce the electrical continuity with the terminal.

At least one aspect is directed to a method. The method can include providing a terminal for a battery. The method can include forming, for the battery, an electrode. The electrode can be in contact with the terminal from a first material that conducts electricity to establish electrical continuity with the terminal. The electrode can include a second material that, in response to a temperature of the electrode exceeding a temperature threshold, expands to reduce the electrical continuity with the terminal. The method can include an act of the second material expanding to reduce the electrical continuity with the terminal. The second material can expand at a greater rate than the first material.

At least one aspect is directed to an electric vehicle. The electric vehicle can include a battery cell. The battery cell can include a current collector connected to a positive terminal and a cathode that can be in electrical contact with the current collector. The cathode can include a first material that conducts electricity to establish electrical continuity with the current collector. The cathode can include a second material that, in response to a temperature of the cathode exceeding a temperature threshold, expands at a greater rate than the first material to decouple the cathode from the current collector and increase a resistance of the battery cell. The electric vehicle can include a battery management system. The battery management system can be executed by one or more processors. The battery management system can determine, based on the increase of the resistance of the battery cell, an occurrence of a decoupling event at the battery cell.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. The foregoing information and the following detailed description and drawings include illustrative examples and should not be considered as limiting.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Following below are more detailed descriptions of various concepts related to, and implementations of, methods, apparatuses, and systems of providing a thermal release layer for an electrode of a battery. The various concepts introduced above and discussed in greater detail below may be implemented in any of numerous ways.

This disclosure is generally directed to systems, methods, compositions of matter and structures involving a thermal release layer in a battery. The disclosure can provide a thermal release technology solution for electrodes in batteries that employ chemistries that provide a desired battery cell performance that can be sensitive to temperature changes. A thermal runaway can be an occurrence in which thermal energy generated within the battery can exceed the rate at which the energy is dissipated from the battery. For some battery chemistry designs, the thermal runaway can occur at the temperature range of about 200°-250° C. The technical advantage of this present technology is that it can provide for a desired battery chemistry while preventing the effects of temperature changes or thermal runaway by reducing or effectively disconnecting the electrode (e.g. a cathode or an anode) from its electrical circuit when a particular temperature threshold is reached.

The thermal release layer of this technical solution can include an electrically non-conductive material that expands (e.g., 5, 10, 20, 30 or 40 or more times its original size) in response to an increase in temperature. For example, this can occur when the non-conductive thermal release material temperature exceeds a thermal threshold, such as at or above 200° C. The expansion of the electrically non-conductive material particles can cause the electrode to have its electrical flow reduced or disconnected from the terminal of the battery. As a result, the electrical continuity between the electrode (e.g., a cathode) and a current collector that can be in electrical contact with the terminal, can be reduced or severed. By disconnecting the electrode, this technology can prevent the temperature from increasing, thus precluding the battery from having its temperature increase.

Figure 1:
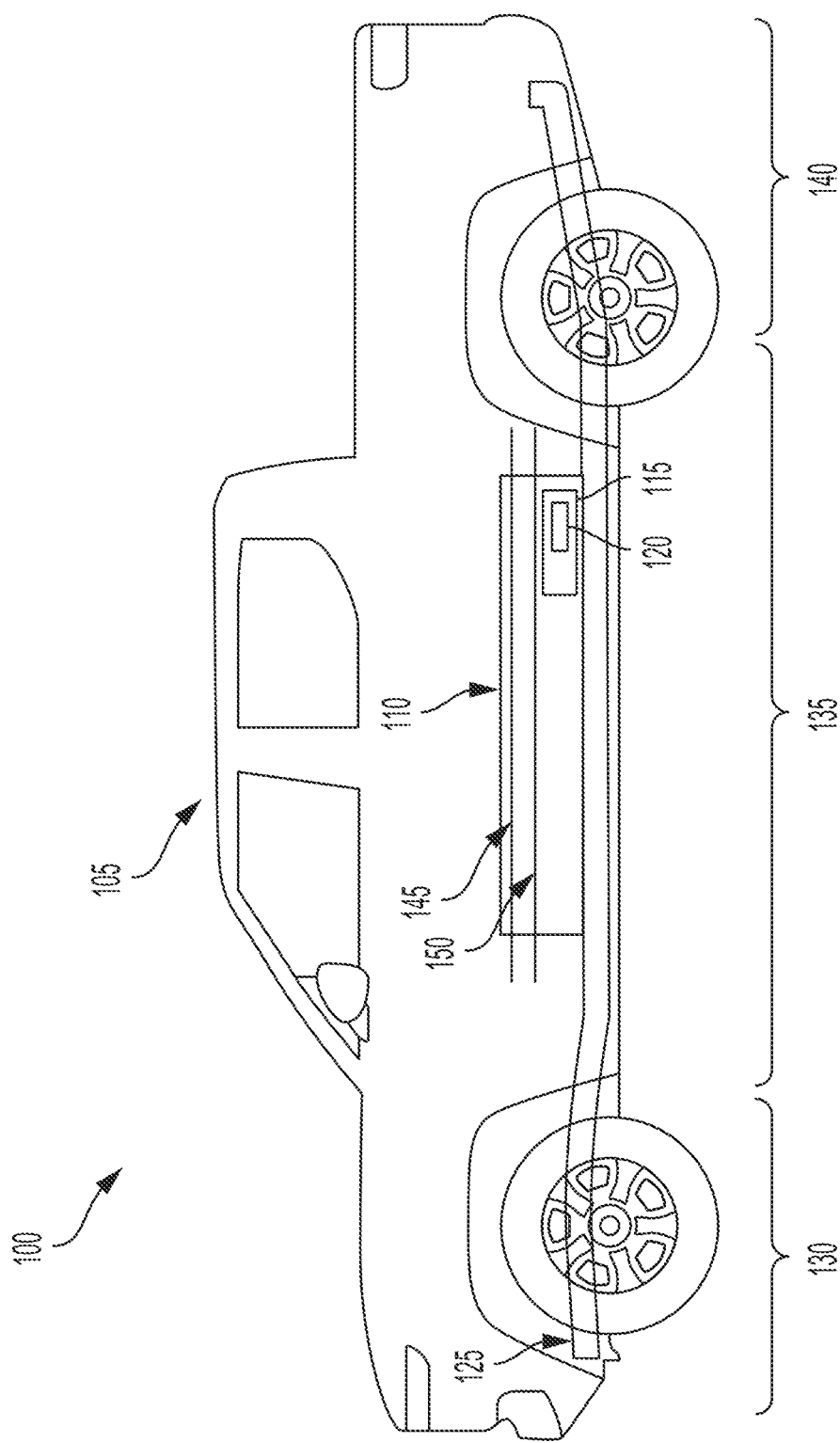
FIG. 1 depicts an example vehicle comprising a battery pack.

FIG. 1 depicts an example cross-sectional view 100 of an electric vehicle 105 installed with at least one battery pack 110. Electric vehicles 105 can include electric trucks, electric sport utility vehicles (SUVs), electric delivery vans, electric automobiles, electric cars, electric motorcycles, electric scooters, electric passenger vehicles, electric passenger or commercial trucks, hybrid vehicles, or other vehicles such as sea or air transport vehicles, planes, helicopters, submarines, boats, or drones, among other possibilities. Yet, it should also be noted that battery pack 110 may also be used as an energy storage system to power a building, such as a residential home or commercial building. Electric vehicles 105 can be fully electric or partially electric (e.g., plug-in hybrid) and further, electric vehicles 105 can be fully autonomous, partially autonomous, or unmanned. Electric vehicles 105 can also be human operated or non-autonomous. Electric vehicles 105 such as electric trucks or automobiles can include on-board battery packs 110, battery modules 115, or battery cells 120 to power the electric vehicles. The electric vehicle 105 can include a chassis 125 (e.g., a frame, internal frame, or support structure). The chassis 125 can support various components of the electric vehicle 105. The chassis 125 can span a front portion 130 (e.g., a hood or bonnet portion), a body portion 135, and a rear portion 140 (e.g., a trunk, payload, or boot portion) of the electric vehicle 105. The battery pack 110 can be installed or placed within the electric vehicle 105. For example, the battery pack 110 can be installed on the chassis 125 of the electric vehicle 105 within one or more of the front portion 130, the body portion 135, or the rear portion 140. The battery pack 110 can include or connect with at least one busbar, e.g., a current collector element. For example, the first busbar 145 and the second busbar 150 can include electrically conductive material to connect or otherwise electrically couple the battery modules 115 or the battery cells 120 with other electrical components of the electric vehicle 105 to provide electrical power to various systems or components of the electric vehicle 105.

Figure 2A:
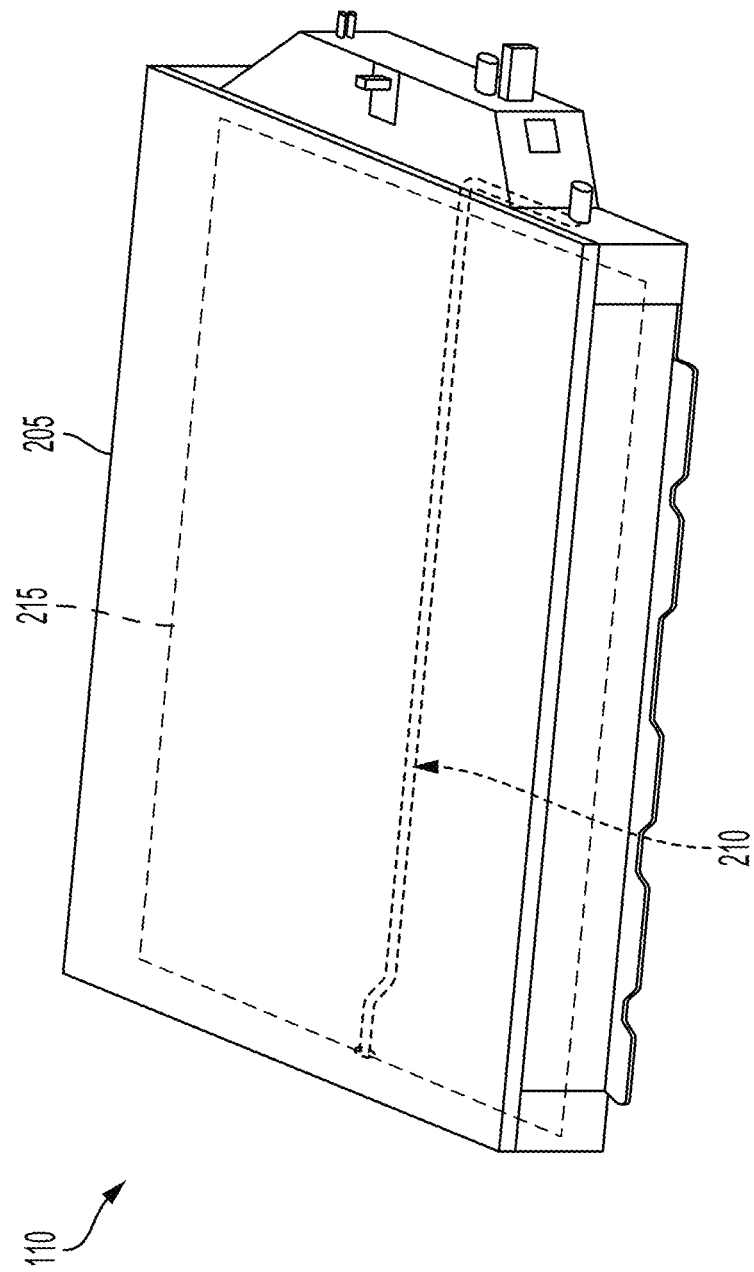
FIG. 2A depicts an example battery pack.

FIG. 2A depicts an example battery pack 110. Referring to FIG. 2A, among others, the battery pack 110 can provide power to the electric vehicle 105. Battery packs 110 can include any arrangement or network of electrical, electronic, mechanical or electromechanical devices to power a vehicle of any type, such as the electric vehicle 105. The battery pack 110 can include at least one housing 205. The housing 205 can include at least one battery module 115 or at least one battery cell 120, as well as other battery pack components. The housing 205 can include a shield on the bottom and/or underneath the battery module 115 to protect the battery module 115 from external conditions, particularly if the electric vehicle 105 is driven over rough terrains (e.g., off-road, trenches, rocks, etc.) The battery pack 110 can include at least one cooling line 210 that can distribute fluid through the battery pack 110 as part of a thermal/temperature control or heat exchange system that can also include at least one cold plate 215. In some instances, the cold plate 215 may be positioned in relation to a top submodule and a bottom submodule, such as in between the top and bottom submodules, among other possibilities. The cooling line 210 can be coupled with, part of, or independent from the cold plate 215.

Figure 2B:
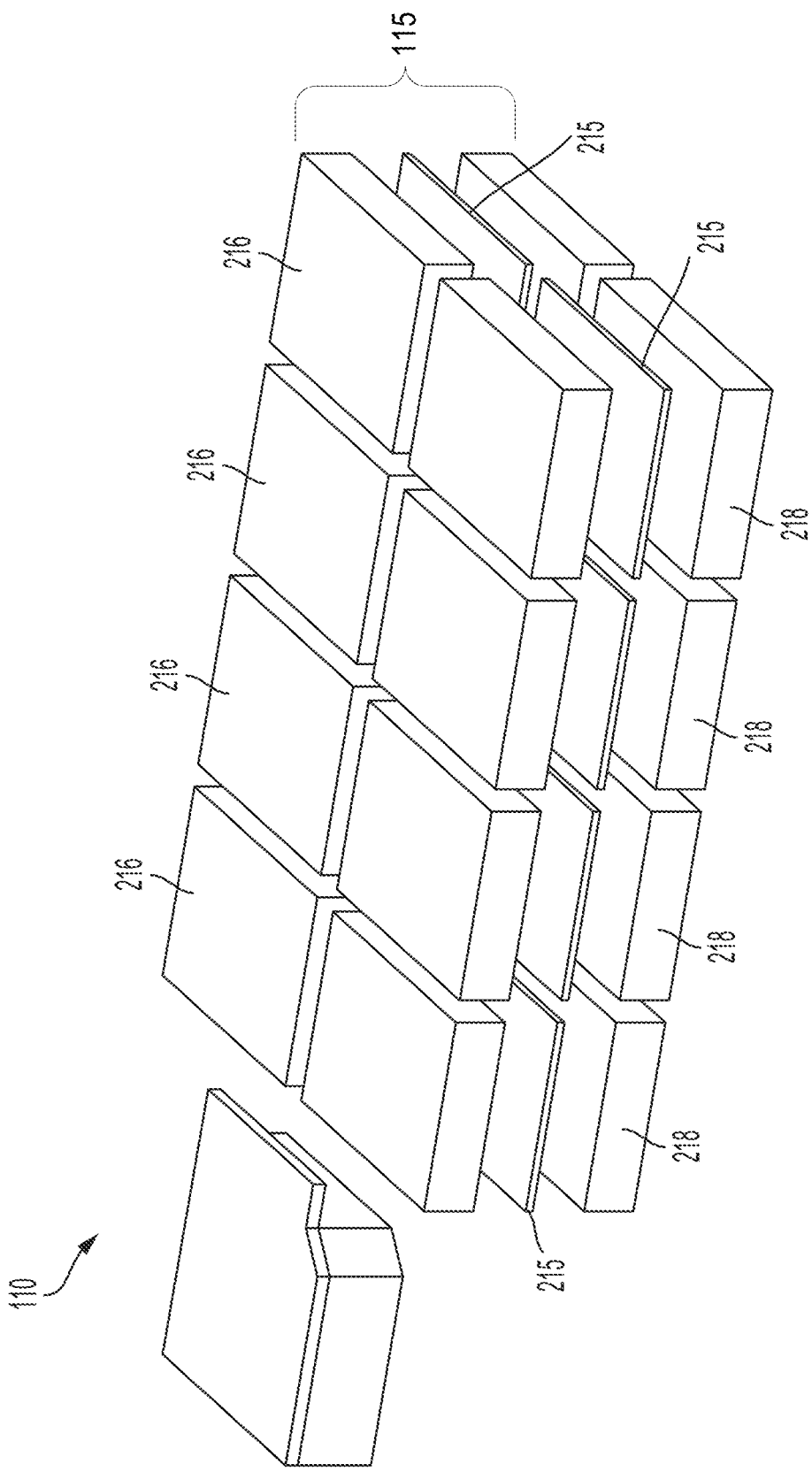
FIG. 2B depicts an example battery pack including example battery modules.
Figure 2C:
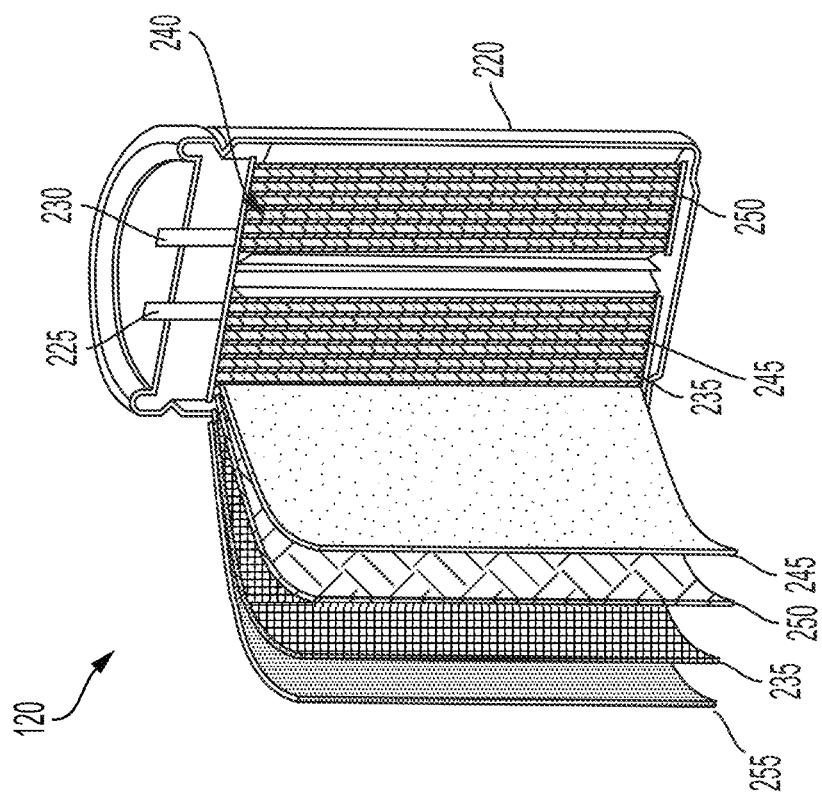
FIG. 2C depicts a cross sectional view of an example battery cell.

FIG. 2B depicts example battery modules 115, and FIG. 2C depicts an example cross sectional view of a battery cell 120. The battery modules 115 can include at least one submodule. For example, the battery modules 115 can include at least one top submodule 216 or at least one bottom submodule 218. At least one cold plate 215 can be disposed between the top submodule 216 and the bottom submodule 218. For example, one cold plate 215 can be configured for heat exchange with one battery module 115. The cold plate 215 can be disposed or thermally coupled between the top submodule 216 and the bottom submodule 218. One cold plate 215 can also be thermally coupled with more than one battery module 115 (or more than two submodules 216, 218). The battery submodules 216, 218 can collectively form one battery module 115. In some examples each submodule 216, 218 can be considered as a complete battery module 115, rather than a submodule.

The battery modules 115 can each include a plurality of battery cells 120. The battery modules 115 can be disposed within the housing 205 of the battery pack 110. The battery modules 115 can include battery cells 120 that are cylindrical cells or prismatic cells, for example. The battery module 115 can operate as a modular unit of battery cells 120. For example, a battery module 115 can collect current or electrical power from the battery cells 120 that are included in the battery module 115 and can provide the current or electrical power as output from the battery pack 110. The battery pack 110 can include any number of battery modules 115. For example, the battery pack can have one, two, three, four, five, six, seven, eight, nine, ten, eleven, twelve or other number of battery modules 115 disposed in the housing 205. It should also be noted that each battery module 115 may include a top submodule 216 and a bottom submodule 218, possibly with a cold plate 215 in between the top submodule 216 and the bottom submodule 218. The battery pack 110 can include or define a plurality of areas for positioning of the battery module 115. The battery modules 115 can be square, rectangular, circular, triangular, symmetrical, or asymmetrical. In some examples, battery modules 115 may be different shapes, such that some battery modules 115 are rectangular but other battery modules 115 are square shaped, among other possibilities. The battery module 115 can include or define a plurality of slots, holders, or containers for a plurality of battery cells 120.

Battery cells 120 can have a variety of form factors, shapes, or sizes. For example, battery cells 120 can have a cylindrical, rectangular, square, cubic, flat, or prismatic form factor. Battery cells 120 can be assembled, for example, by inserting a winded or stacked electrode roll (e.g., a jelly roll) including electrolyte material into at least one battery cell housing 220. The electrolyte material, e.g., an ionically conductive fluid or other material, can generate or provide electric power for the battery cell 120. A first portion of the electrolyte material can have a first polarity, and a second portion of the electrolyte material can have a second polarity. The housing 220 can be of various shapes, including cylindrical or rectangular, for example. Electrical connections can be made between the electrolyte material and components of the battery cell 120. For example, electrical connections with at least some of the electrolyte material can be formed at two points or areas of the battery cell 120, for example to form a first polarity terminal 225 (e.g., a positive terminal) and a second polarity terminal 230 (e.g., a negative terminal). The polarity terminals can be made from electrically conductive materials to carry electrical current from the battery cell 120 to an electrical load, such as a component or system of the electric vehicle 105.

For example, the battery cell 120 can include a rechargeable battery cell, such as a lithium-ion battery cell. In lithium-ion battery cells, during a discharge process, power can be provided by moving lithium ions from a negative electrode through an electrolyte to a positive electrode. Conversely, when a Li-ion battery is being charged, lithium ions can move back from a positive electrode to a negative electrode, making the battery ready for the next discharge cycle. For rechargeable batteries, while during the discharge process a positive electrode can act as a cathode and a negative electrode as an anode, conversely, when the battery is being charged, due to the inverse ion movement, the positive electrode can act as the anode and the negative electrode can act as the cathode. For example, a battery cell anode can include lithium or graphite, and the battery cell cathode can include a lithium-based oxide material. The electrolyte material can be disposed in the battery cell 120 to separate or detach the anode and cathode from each other and to facilitate transfer of lithium ions between the anode and cathode. It should be noted that battery cell 120 can also take the form of a solid state battery cell developed using solid electrodes and solid electrolytes. Yet further, some battery cells 120 can be solid state battery cells and other battery cells 120 can include liquid electrolytes for lithium-ion battery cells.

The battery cell 120 can be included in battery modules 115 or battery packs 110 to power components of the electric vehicle 105. The battery cell housing 220 can be disposed in the battery module 115, the battery pack 110, or a battery array installed in the electric vehicle 105. The housing 220 can be of any shape, such as cylindrical with a circular cross-section (e.g., as depicted), elliptical, or ovular base, among others. The shape of the housing 220 can also be prismatic with a polygonal base, such as a triangle, a square, a rectangle, a pentagon, and a hexagon, among others.

The housing 220 of the battery cell 120 can include one or more materials with various electrical conductivity or thermal conductivity, or a combination thereof. The electrically conductive and thermally conductive material for the housing 220 of the battery cell 120 can include a metallic material, such as aluminum, an aluminum alloy with copper, silicon, tin, magnesium, manganese, or zinc (e.g., aluminum 1000, 4000, or 5000 series), iron, an iron-carbon alloy (e.g., steel), silver, nickel, copper, and a copper alloy, among others. The electrically insulative and thermally conductive material for the housing 220 of the battery cell 120 can include, for example, a ceramic material (e.g., silicon nitride, silicon carbide, titanium carbide, zirconium dioxide, beryllium oxide, and among others) and a thermoplastic material (e.g., polyethylene, polypropylene, polystyrene, polyvinyl chloride, or nylon).

The battery cell 120 can include at least one cathode layer 235. The cathode layer 235 can include, for example, a composite cathode layer, a compound cathode layer, a compound cathode, a composite cathode, or a cathode. The cathode layer 235 can be disposed within the cavity 240. Electrical current can flow via the cathode layer 235. The cathode layer 235 can output electrical current out from the battery cell 120. Electrons can flow into the battery cell 120 via the cathode layer 235 as the battery cell 120 discharges. The cathode layer 235 can release lithium ions during the discharging of the battery cell 120. Electrical current can flow into the battery cell 120 via the cathode layer 235. Electrons can be output from the battery cell 120 via the cathode layer 235 as the battery cell 120 is charges. The cathode layer 235 can receive lithium ions during the charging of the battery cell 120.

The battery cell 120 can include at least one anode layer 245. The anode layer 245 can be disposed within the cavity 240. The cavity 240 can be defined by the housing 220. The anode layer 245 can receive electrical current into the battery cell 120 and output electrons during the operation of the battery cell 120 (e.g., charging or discharging of the battery cell 120). The anode layer 245 can include an active substance. The active substance can include, for example, an activated carbon or a material infused with conductive materials (e.g., artificial or natural graphite, or blended), lithium titanate ($Li_4Ti_5O_{12}$), or a silicon-based material (e.g., silicon metal, oxide, carbide, pre-lithiated).

The battery cell 120 can include an electrolyte layer 250. The electrolyte layer 250 can be disposed within the cavity 240. The electrolyte layer 250 can be arranged between the anode layer 245 and the cathode layer 235 to separate the anode layer 245 and the cathode layer 235. The electrolyte layer 250 can transfer ions between the anode layer 245 and the cathode layer 235. The electrolyte layer 250 can transfer cations from the anode layer 245 to the cathode layer 235 during the operation of the battery cell 120. The electrolyte layer 250 can transfer anions (e.g., lithium ions) from the cathode layer 235 to the anode layer 245 during the operation of the battery cell 120.

The electrolyte layer 250 can include or be made of a liquid electrolyte material. The liquid electrolyte material can include a lithium salt dissolved in a solvent. The lithium salt for the liquid electrolyte material for the electrolyte layer 250 can include, for example, lithium tetrafluoroborate ($LiBF_4$), lithium hexafluorophosphate ($LiPF_6$), and lithium perchlorate ($LiClO_4$), among others. The solvent can include, for example, dimethyl carbonate (DMC), ethylene carbonate (EC), and diethyl carbonate (DEC), among others. The electrolyte layer 250 can include or be made of a solid electrolyte material, such as a ceramic electrolyte material, polymer electrolyte material, or a glassy electrolyte material, or among others, or any combination thereof. The ceramic electrolyte material for the electrolyte layer 250 can include, for example, lithium phosphorous oxy-nitride ($Li_xPO_yN_z$), lithium germanium phosphate sulfur ($Li_{10}GeP_2S_{12}$), Yttria-stabilized Zirconia (YSZ), NASICON ($Na_3Zr_2Si_2PO_{12}$), beta-alumina solid electrolyte (BASE), perovskite ceramics (e.g., strontium titanate ($SrTiO_3$)), among others. The polymer electrolyte material (e.g., a hybrid or pseudo-solid state electrolyte) for electrolyte layer 250 can include, for example, polyacrylonitrile (PAN), polyethylene oxide (PEO), polymethyl-methacrylate (PMMA), and polyvinylidene fluoride (PVDF), among others. The glassy electrolyte material for the electrolyte layer 250 can include, for example, lithium sulfide-phosphor pentasulfide ($Li_2S-P_2S_5$), lithium sulfide-boron sulfide ($Li_2S-B_2S_3$), and Tin sulfide-phosphor pentasulfide ($SnS-P_2S_5$), among others.

Battery cell 120 can include a current collector 255. The current collector 255 can be disposed within the cavity 240. Current collector 255 can include any electrically conductive material or composite that is in electrical contact with the cathode layer 235 and can facilitate moving of electrons to or from a cathode layer 235. A current collector can act as a bridge between the battery cell electrodes, such as the cathode or the anode and first or second polarity terminals 225 or 230. A current collector can include one or more of, or a combination of: aluminum, copper, nickel, titanium, stainless steel, or carbonaceous materials. A current collector 255 can include etched or carbon coated portions or regions. Current collector 255 can be connected to and maintain an electrical contact with a terminal of a battery cell 120, such as the first polarity terminal 225 or the second polarity terminal 230.

Figure 3:
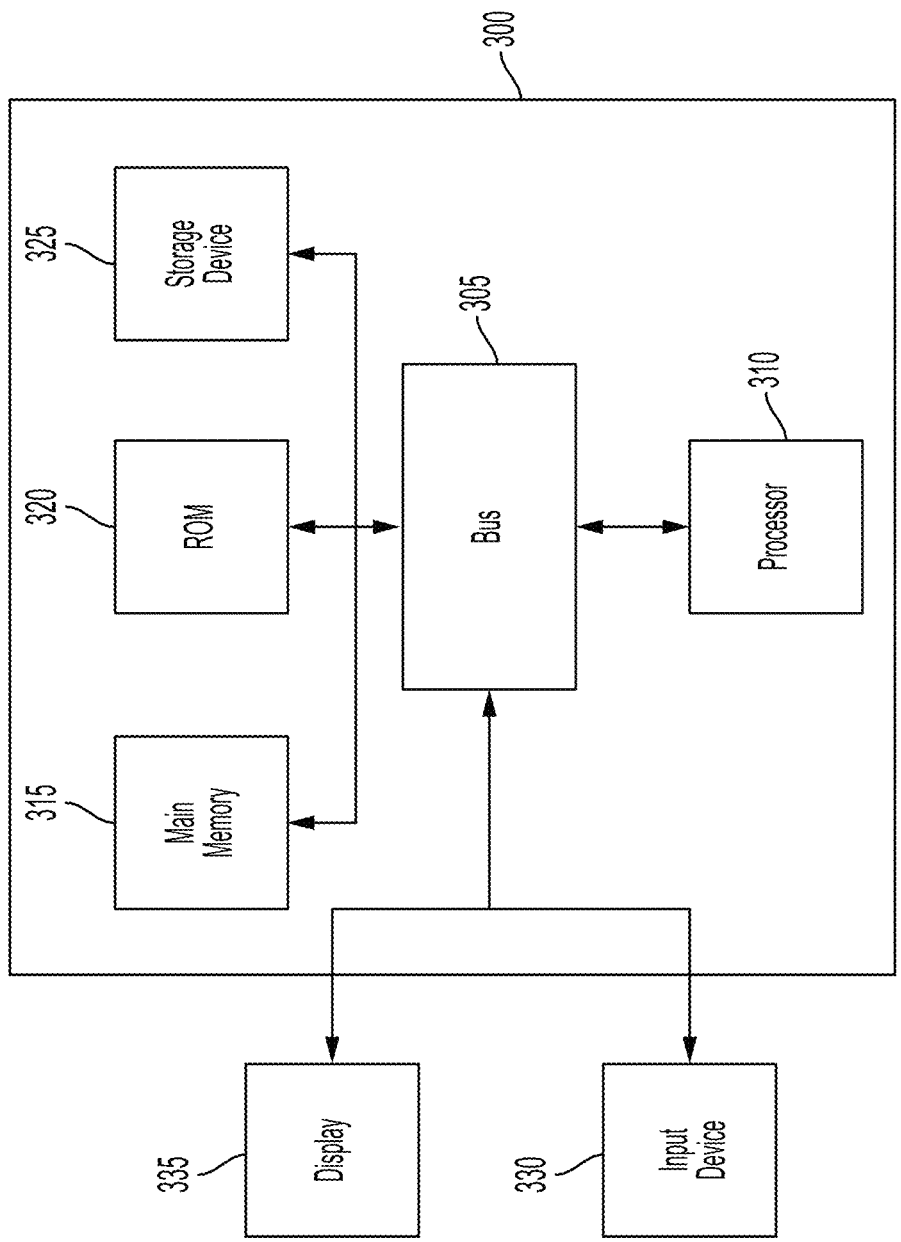
FIG. 3 is a block diagram illustrating an architecture for a computer system that can be employed to implement elements of the systems and methods described and illustrated herein.

FIG. 3 depicts an example block diagram of an example computer system 300. The computer system or computing device 300, or computing system 300 can include or be used to implement a data processing system or its components. The computing system 300 can include at least one bus 305 or other communication component for communicating information and at least one processor 310 or processing circuit coupled to the bus 305 for processing information. The computing system 300 can include one or more processors 310 or processing circuits coupled to the bus for processing information. The computing system 300 can include at least one main memory 315, such as a random access memory (RAM) or other dynamic storage device, coupled to the bus 305 for storing information, and instructions to be executed by the processor 310. The main memory 315 can be used for storing information during execution of instructions by the processor 310. The computing system 300 can include at least one read only memory (ROM) 320 or other static storage device coupled to the bus 305 for storing static information and instructions for the processor 310. A storage device 325, such as a solid state device, magnetic disk or optical disk, can be coupled to the bus 305 to persistently store information and instructions.

The computing system 300 can be coupled via the bus 305 to a display 335, such as a liquid crystal display, or active matrix display, for displaying information to a user such as a driver of the electric vehicle 105 or other end user. An input device 330, such as a keyboard or voice interface may be coupled to the bus 305 for communicating information and commands to the processor 310. The input device 330 can include a touch screen display 335. The input device 330 can include a cursor control, such as a mouse, a trackball, or cursor direction keys, for communicating direction information and command selections to the processor 310 and for controlling cursor movement on the display 335.

The processes, systems and methods described herein can be implemented by the computing system 300 in response to the processor 310 executing an arrangement of instructions contained in main memory 315. Such instructions can be read into main memory 315 from another computer-readable medium, such as the storage device 325. Execution of the arrangement of instructions contained in main memory 315 causes the computing system 300 to perform the illustrative processes described herein. One or more processors in a multi-processing arrangement may also be employed to execute the instructions contained in main memory 315. Hard-wired circuitry can be used in place of or in combination with software instructions together with the systems and methods described herein. Systems and methods described herein are not limited to any specific combination of hardware circuitry and software.

Although an example computing system has been described in FIG. 3, the subject matter including the operations described in this specification can be implemented in other types of digital electronic circuitry, or in computer software, firmware, or hardware, including the structures disclosed in this specification and their structural equivalents, or in combinations of one or more of them.

Figure 4:
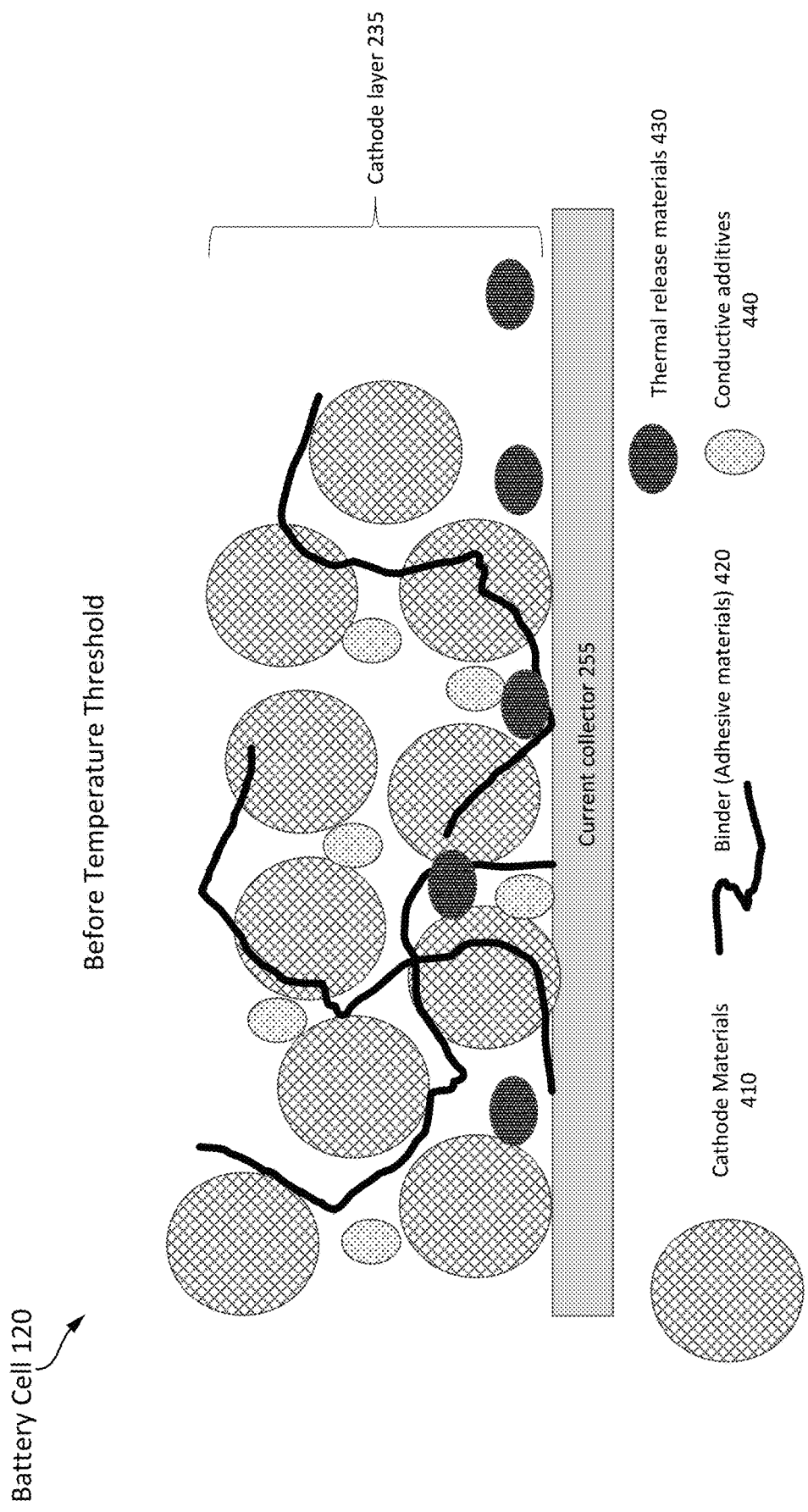
FIG. 4 depicts a cross sectional view of an example interface between a current collector and a cathode of a battery cell before a thermal threshold is exceeded.

FIG. 4 depicts an example of a cathode layer 235 interfacing with a current collector 255 in a battery cell 120. A cathode layer 235, which can be referred to as a cathode 235, can include one or more cathode materials 410. The cathode layer 235 can include one or more binders 420. The binders 420 can include an adhesive material. The cathode layer 235 can include or be in contact with one or more thermal release materials 430. The cathode layer 235 can include one or more conductive additives 440. The cathode layer 235 can be in a physical contact with the current collector 255, which can also be referred to as the current collector layer 255. The cathode layer 235 and the current collector layer 255 can be in a physical or an electrical contact with each other. The cathode layer 235 and the current collector 255 layer can form a laminated structure between which there is an electrical continuity. In some cases, the cathode 235 can be replaced with an anode layer 245, which can be referred to as an anode 245. The illustrated example in FIG. 4 can refer to a mode of operation of a battery cell 120 before a temperature threshold has been exceeded. Before the temperature threshold is exceeded, the electrical continuity between the electrode (e.g. a cathode layer 235 or an anode layer 245) and the current collector 255 can be intact and not reduced or severed.

Electrical continuity can include, for example, the presence of a path for current flow. When such a path is reduced, for example, it can result in a higher electrical resistance, which can be measured in ohms. A path that has a low electrical resistance, such as for example, having less than 0.1 ohms of resistance, can be considered a path of electrical continuity. A path that has a high electrical resistance, such as for example, 100 mega-ohms ("M-ohms") can be considered an open circuit.

Cathode materials 410 shown in FIG. 4 can include any number of materials functioning as active cathode materials. For example, cathode materials 410 can include one or more of lithium transition metal oxides, such as a lithium cobalt oxide ("LCO"), lithium manganese oxide ("LMO"), lithium nickel manganese cobalt oxide ("NMC") or lithium nickel cobalt aluminum oxide ("NCA"). Cathode materials 410 can include lithium iron phosphate ("LFP") and/or lithium manganese iron phosphate ("LMFP"). Cathode materials 410 can include $Li_2MnO_3$ material ("OLO") or lithium nickel cobalt aluminum oxide ("NCA"). Some of cathode materials may be coated with a layer with carbon and/or other electrically conducting (e.g. carbon) ionically conducting but insulating (e.g. oxides) materials. Cathode materials 410 can include any one or a combination of the above-mentioned materials or other materials known or used in the industry for providing a cathode layer 235 of a battery.

A binder 420, which can also be referred to as adhesive materials 420, can include any type and form of adhesive material that can bind an electrode to a current collector in electrical contact with a terminal used in a battery cell 120. Binder 420 can include one or more of a polyvinylidene fluoride ("PVdF"), polyvinylpyrrolidone ("PVP"), styrene-butadiene or styrene-butadiene rubber ("SBR"), polytetrafluoroethylene ("PTFE") or carboxymethylcellulose ("CMC"). Binder 420 can include one or more of: Agar-agar, Alginate, Amylose, Arabic gum, Carrageenan, Caseine, Chitosan, Cyclodextrines (carbonyl-beta), Ethylene propylene diene monomer (EPDM) rubber, Gelatine, Gellan gum, Guar gum, Karaya gum, Cellulose (natural), Pectine, PEDOT-PSS, Polyacrilic acid (PAA), Poly(methyl acrylate) (PMA), Poly(vinyl alcohol) (PVA), Poly(vinyl acetate) (PVAc), Polyacrylonitrile (PAN), Polyisoprene (PIpr), Polyaniline (PANi), Polyethylene (PE), Polyimide (PI), Polystyrene (PS), Polyurethane (PU), Polyvinyl butyral (PVB), Polyvinyl pyrrolidone (PVP), Starch, Styrene butadiene rubber (SBR), Tara gum, Tragacanth gum, TRD202A or Xanthan gum. Binder 420 can include any type or form of binder or adhesive known or used in the industry for binding materials in a cathode of a battery cell 120.

Conductive additives 440 can include any carbon-based additive to the cathode layer 235. Conductive additives 440 can include a carbon black material, such as a Super P carbon black material. Conductive additives 440 can include Ketjen Black, Acetylene Black, SWCNT, MWCNT, graphite, carbon nanofiber, and/or graphene. Conductive additives 440 can include a graphite ("SFG6L") material. Conductive additives 440 can include any carbon-based material that is electrically conductive and can provide desired electrical conductivity properties of the cathode layer 235.

Thermal release materials 430 can include materials or particles that can expand. The thermal release materials 430 can expand based on or in response to a condition. For example, the thermal release materials 430 can expand based on or in response to an increase in temperature. Thermally expandable material particles of thermal release materials 430 can have any shape, including for example spheroidal, cubicle, pyramidal, or polygonal. For example, thermally expandable material particles can include spheroidal particles, such as thermally expandable microspheres. A spheroid can refer to an ellipsoid-like or sphere-like shape, such as a shape generated by a revolution of an ellipse about an axis. The particles of the thermal release materials 430 can include a shell, such as a plastic or a polymer shell that can encapsulate a gas. As the temperature of the thermal release materials 430 increases, the gas encapsulated by the shell can expand. For example, when heated above a particular threshold temperature, the gas can expand its volume. As the temperature is increased, thermal release materials 430 particles can expand their volume several times with respect to their original volume at baseline temperature. The baseline temperature can be any temperature between −20° C. and 150° C., such as more than −20° C., −10° C., 0° C., 10° C., 20° C., 30° C., 40° C., 50° C., 60° C., 80° C., 100° C., 110° C., 120° C., 130° C., 140° C. or 150° C.

For example, when heated up to the threshold temperature, the thermal release materials 430 can increase its volume by anywhere between 2 and 50 times, such as for example more than 2, 3, 4, 5, 10, 15, 20, 25, 30, 35, 40, 45 or 50 times with respect to the volume size of the thermal release materials 430 particles at the baseline temperature. Thermal release materials 430 particles can increase their volume as much as, or more than, other materials in the cathode layer 235, such as the cathode materials 410, binder 420 or conductive additives 440. The thermal release materials 430 particles can increase at a rate that is greater than the rate at which cathode materials 410, binder 420 or conductive additives 440 expand. For example, the particles of the thermal release materials 430 can increase their volume by anywhere between 5 and 50 times more than other cathode layer 235 materials, such as, for example, more than 5, 10, 15, 20, 25, 30, 35, 40, 45 or 50 times than other cathode layer 235.

For example, thermal release materials 430 can begin expanding up at temperatures above the baseline temperature. When heated up to a temperature level that is less than the threshold temperature, depending on the material used, the particles of the thermal release materials 430 can expand by some amount that is less than their maximum expandable volume. Upon being cooled down, depending on the material, the thermal release materials 430 particles (e.g., microspheres) can decrease their volume to the original volume at the baseline temperature. For example, when thermal release materials 430 reach or exceed the threshold temperature, depending on the material, the particles of the thermal release material 430 can expand and not shrink back to their original volume when being cooled down to the baseline temperature. For example, when thermal release materials 430 reach or exceed the threshold temperature, the thermal release material 430 particles can form a foam. The foam can be formed by particles of the thermal release materials 430 expanding and remaining expanded. The foam can be formed by particles of the thermal release materials 430 expanding. The foam created can separate or delaminate the electrically conductive portions of cathode layer 235 from the current collector 255. Delaminating the electrically conductive portions of the cathode layer 235 from the current collector 255 can include, for example, dividing or separating the electrically conductive portions of the cathode layer 235 from the current collector 255 surface.

The material particles of the thermal release materials 430 (e.g. microspheres) can be formed by suspension polymerization in which an organic phase that can include monomers, blowing agent, initiator and a cross-linker, can be mixed with a water phase that can include water, colloid and surfactant. By using agitation, small monomer droplets can form in the water phase forming an emulsion. The polymerization reaction can be initiated by heating, transforming the monomer droplets into thermally expandable microspheres. The droplets can be stabilized by the colloid, either flocculated silica or $Mg(OH)_2$, and the surfactant.

Thermal release materials 430 can thermal release materials 430 having a Temperature-start ("T-start") temperature of 122-132° C. The T-start temperature can be a temperature which, when exceeded, can cause the particles to begin expanding at a faster rate than other materials in the electrode, but not yet reaching their maximum expansion size. The thermal release material 430 material can include a T-max temperature of 194-206° C., which can be a threshold temperature at which the microsphere particles of the thermal release materials 430 can reach their maximum expansion or volumetric size. The threshold temperature can refer to a temperature range at which the thermal release materials 430 expand at a greater rate or to a certain volume. For example, at 194-206° C. microspheres of the thermal release materials 430 can expand their volume with respect to their original volume at a baseline temperature by a factor of 5, 10, 20, 30, 40, 50 or more. For example, if the thermal threshold of 194-206° C. is reached or exceeded, the thermal release materials 430 can form a foam that can electrically insulate and delaminate the cathode layer 235 from a current collector 255. For example, if the thermal threshold of 194-206° C. is exceeded, the thermal release materials 430 used along with an adhesive layer between the cathode 235 and current collector 255, can create a physical separation, or a gap, between the cathode layer 235 and the current collector 255. Based on the internal characteristics of the type of thermal release materials 430, temperature thresholds, such as T-start and T-max, can change accordingly. For example, the T-start temperature can be a temperature that is greater than 100° C., 110° C., 120° C., 130° C., 150° C., 160° C., 170° C., 180° C., 190° C., 200° C., 210° C., 220° C. or more. T-max temperature can be a temperature that is greater than 150° C., 160° C., 170° C., 180° C., 190° C., 200° C., 210° C., 220° C., 230° C., 240° C., 250° C., 260° C. or more.

Thermal release materials 430 can include an initial thermal threshold at which particles of the thermal release materials 430 begin to expand. Once the initial thermal threshold is exceeded, the thermal release materials 430 particles can start to increase by volume, pushing surrounding material away. For example, thermal release materials 430 can provide a separation between the electrically conductive materials in the cathode layer 235 (e.g. conductive additives 440 and cathode materials 410) and the current collector 255, thereby reducing electrical continuity between the cathode layer 235 and the current collector 255. The electrical continuity prior to the thermal threshold being exceeded can be 0.01 ohms, 0.05 ohms, 0.1 ohms, 0.2 ohms, 0.3 ohms, 0.5 ohms, 0.7 ohms, 1 ohm, 2 ohms, 5 ohms or 10 ohms. Once the thermal threshold is reached or exceeded, the electrical continuity can be greater than 10 k-ohms, 50 k-ohms, 100 k-ohm, 500 k-ohms, 1 M-ohm, 10 M-ohms or 100 M-ohms. If the temperature was reduced prior to reaching or exceeding the temperature threshold for expanding the particles of the thermal release materials 430 to their maximum size (e.g., T-max), then upon cooling down the thermal release material 430 particles can, depending on the material, reduce in volume.

When thermal release materials 430 a thermal threshold (e.g., T-max), the thermal release materials 430 can turn into or otherwise create a foam. For example, once the maximum thermal threshold is exceeded, the thermal release materials 430 particles can form a foam. When the thermal release materials 430 form a form, the thermal release materials 430 can delaminate the cathode layer 235 from the current collector 255. When this occurs, the adhesive layer may not adhere the cathode layer 235 to the current collector 255 and the electrical continuity between the cathode layer 235 and the current collector 255 layer can be reduced. The electrical continuity can be reduced such that the battery cell 120 is in an open circuit state in which electrical resistance increases and current is not flowing via the cathode layer 235 or the current flow is less than 0.1 amps, 0.05 amps, or 0.01 amps, for example.

FIG. 4 can refer to an example in which a cathode layer 235, is formed with cathode materials 410, binder 420 and conductive additives 440 and thermal release materials 430 are added to provide the functionality of a thermal release. The thermal release materials 430 can also be used with an anode 245 that can interface with a current collector 255 that can be connected to a terminal, and can act as a thermal fuse upon reaching or exceeding a thermal threshold, similar to the example discussed in FIG. 4 and further in FIG. 5.

Figure 5:
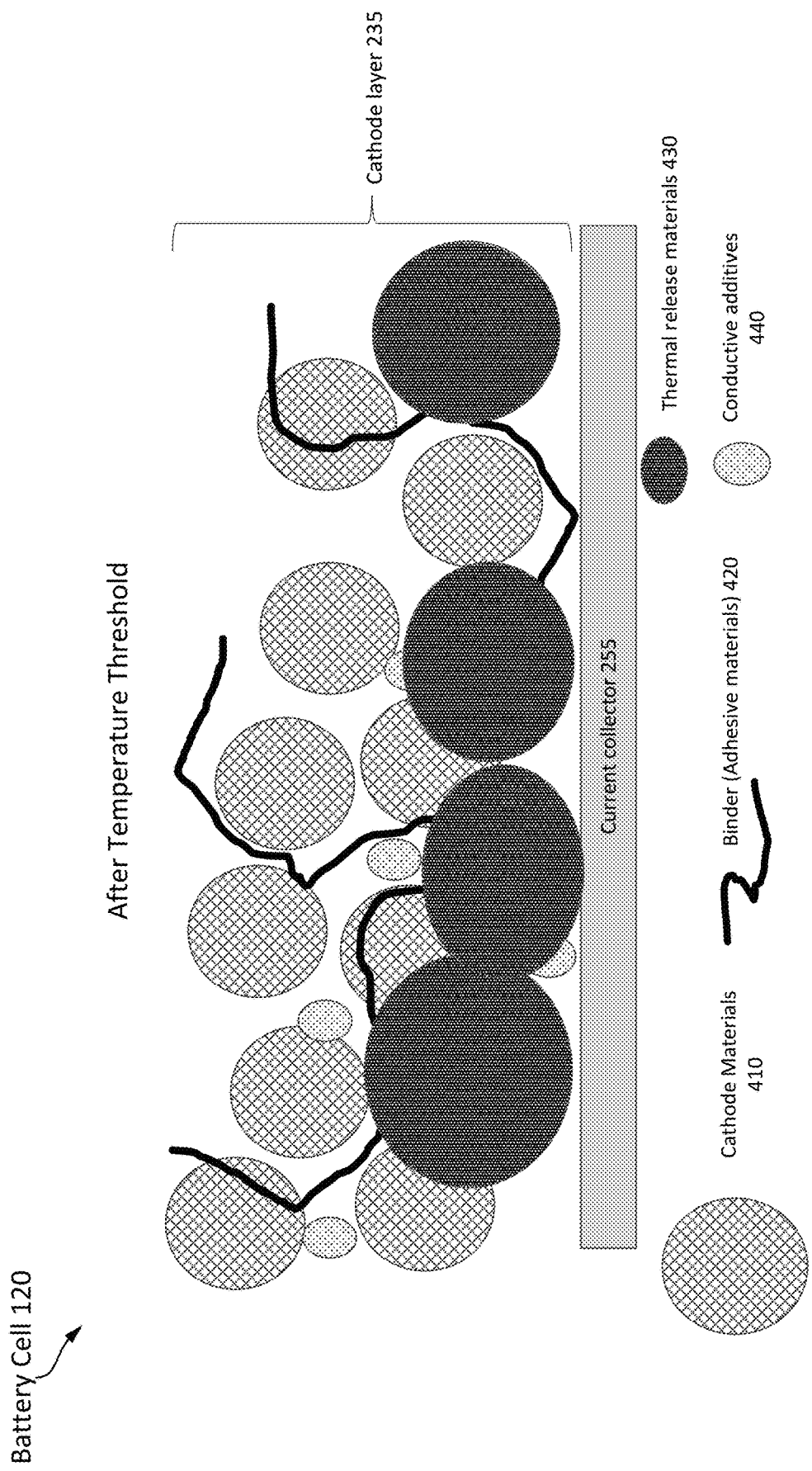
FIG. 5 depicts a cross sectional view of an example interface between a current collector and a cathode of a battery cell after a thermal threshold is exceeded.

FIG. 5 depicts an example of a system in which the thermal threshold has been exceeded and the thermal release material 430 has expanded. Showing the same or similar example as in FIG. 4, but after a thermal threshold is exceeded, FIG. 5 also shows a cathode layer 235 comprising cathode materials 410, binder 420, conductive additives 440 and thermal release materials 430. However, unlike in FIG. 4, in FIG. 5, thermal release materials 430 have a significantly larger volume, as a result of which thermal release materials 430 separate the electrically conductive particles of the cathode layer 235 (e.g. cathode materials 410 and conductive additives 440). This can result in reduced electrical continuity or electrical insulation between the current collector 255 and the cathode layer 235.

The thermal release materials 430 can act as a thermally triggered electrical fuse causing electrical discontinuity between the electrically conductive materials of the cathode layer 235 (e.g., cathode materials 410 and conductive additives 440) and the current collector 255.

The thermal release materials 430 can expand in response to the thermal threshold being reached or exceeded or a thermal range being met or exceeded, such as for example the threshold of 200° C. or a range of 194° C. to 206° C. Once the thermal threshold is reached or exceeded, the adhesive 420 binding the cathode 235 to current collector 255 may no longer provide adhesion and the cathode layer 235 from the current collector 255 can be detached or decoupled, including by delaminating. Decoupling or delaminating can be done by forming an intervening layer of foam between the cathode layer 235 and current collector 255.

Geometries of the current collector 255 and the cathode layer 235 can vary. For example, surfaces of the current collector 255 and cathode layer 235 can include grooves, ridges or other features that facilitate an electrical contact. The contact between the features can include one or more components of either cathode layer 235 or current collector 255 layer that can overlap over the other layer with which it interfaces. For example, coupling between an electrode (e.g., cathode layer 235 or anode layer 245) and a terminal of a battery (e.g. via current collector 255) can be implemented using a component to establish the electrical continuity via adhesion. The component can overlap with the cathode layer 235, current collector 255, or both. The component can provide a layer for the electrode that is in contact with the component and comprising the thermal release materials 430 configured to decouple or detach the electrode from the component at the temperature threshold.

The battery pack 110 can include a battery cell 120 including a terminal, such as a first polarity terminal 225 or second polarity terminal 230, which can be connected to an electrode (e.g. a cathode 235 or an anode 245) in contact with the terminal (e.g. 225, 230). The terminal (e.g. terminal 225 or 230) can include, or be in electrical continuity with, a current collector 255. The electrode can include a first material, which can include a combination of cathode materials 410 or conductive additives 440 that conducts electricity to establish electrical continuity with the terminal (e.g. 225, 230). The electrode can comprise a second material (e.g. thermal release materials 430) that, in response to a temperature of the electrode meeting and/or exceeding a temperature threshold, expands to reduce the electrical continuity with the terminal (e.g. terminal 225 or 230). For example, the electrical continuity may include electrical conductivity or specific conductance, such that the second material expands to reduce the conductivity or conductance. Further, the second material may include electrical resistive material to reduce the continuity or conductance. It should be noted that the second material expanding to reduce the electrical continuity should interpreted broadly to include expanding to lower the electrical continuity, possibly lowering the electrical continuity below a threshold conductance. Further, expanding to lower the electrical continuity may include decoupling the terminal 225 or 230 from the electrode.

The second material (e.g. thermal release materials 430) can expand at a greater rate than the first material (e.g. one or more of cathode materials 410 or conductive additives 440). The battery cell can include an adhesive (e.g. binder 420) that binds the electrode (e.g. cathode 235 or anode 245) to the terminal (e.g. terminal 225 or 230). The adhesive can bind the electrode (e.g. cathode 234 or anode 245) to a current collector 255 in electrical contact with the terminal (e.g. 225 or 230). The thermal release materials 430 can expand at a greater rate than the binder 420 at the temperature threshold or at temperatures approaching the temperature threshold.

The battery cell 120 can include a component that couples the terminal (e.g. terminal 225 or 230) and the electrode (e.g. cathode 235 or anode 245) via adhesion to establish the electrical continuity. The battery cell electrode (e.g. cathode 235 or anode 245) can include a layer in contact with the component. The layer can include the second material (e.g. thermal release materials 430) and be configured to decouple or detach the electrode (e.g. 235 or 245) from the component at the temperature threshold. The layer can be configured to delaminate the electrode (e.g. 235 or 245) from the component.

Decoupling of the electrode and the component can include delamination between the two. Decoupling can be done by foam that can be generated by the second material (e.g. thermal release materials 430). The battery cell 120 can include the electrode (e.g. 235 or 245) comprising a layer in electrical contact with the terminal (e.g. 225 or 230), the layer comprising the second material (e.g. thermal release material 430) that expands at a greater rate than the first material.

The battery cell 120 can include at least a portion of the layer comprising an adhesive material (e.g. binder 420) to couple the terminal (e.g. 225 or 230) or a current collector 255 connected to the terminal and the electrode (e.g. a cathode 235). Responsive to the temperature of the second material (e.g. thermal release material 430) exceeding the temperature threshold, the second material can expands to decouple or detach the electrode (e.g. 225 or 235) from the terminal by generating foam to cause the reduction in the electrical continuity via the terminal. The battery cell 120 can comprise the terminal (e.g. 225, 230) comprising a current collector 255 and the electrode (e.g. 225 or 230) that can include a cathode comprising nickel.

The battery cell 120 can include multiple electrodes (e.g. cathodes 235 and anodes 245). Each electrode can include the second material (e.g. thermal release materials 430). Each electrode (e.g. 235 or 245) can be in electrical contact with the terminal (e.g. 225 or 230). The electrical continuity of a first electrode (e.g. 235 or 245) of the plurality of electrodes can be reduced responsive to a temperature of the second material (e.g. thermal release materials 430) at the first electrode exceeding the temperature threshold. Electrical continuity of a second electrode (e.g. 235 or 245) of the plurality of electrodes can be maintained based on the temperature of the second material (e.g. thermal release materials 430) at the second electrode (e.g. 235 or 245) being less than the temperature threshold.

The temperature threshold for the second material (e.g. thermal release materials 430) can be greater than or equal to 200 degrees Celsius. The electrical continuity, prior to the temperature of the second material (e.g. thermal release materials 430) exceeding the temperature threshold, can correspond to electrical resistance less than or equal to 0.1 ohms. The reduction in the electrical continuity subsequent to the temperature of the second material (e.g. thermal release materials 430) exceeding the temperature threshold can correspond to an open circuit.

The battery cell 120 can include the terminal (e.g. 225 or 230) and the electrode (e.g. 235 or 245). The battery cell 120 can be included in a battery pack 110 of a vehicle 105, while the second material (e.g. 430) can include particles formed from plastic or polymer. The particles can have a shape that is ellipsoidal or spheroidal and encapsulate a gas. The gas can expand at the temperature threshold to cause an increase in volume of each of the plurality of particles by at least a factor of 5.

Figure 6:
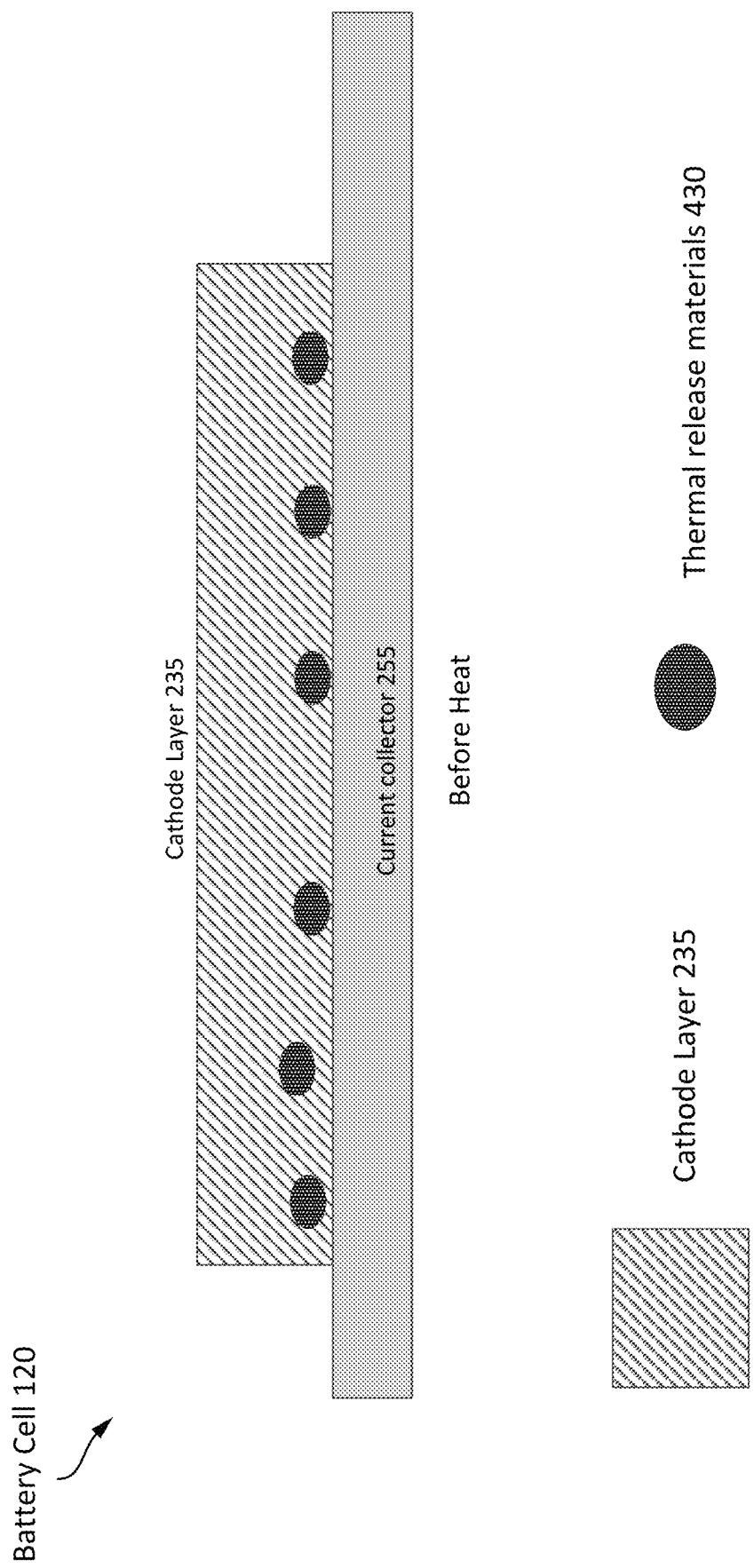
FIG. 6 depicts a cross sectional view of an example interface between a current collector and a cathode of a battery cell in which a layer of thermal release materials is used before a thermal threshold is exceeded.
Figure 7:
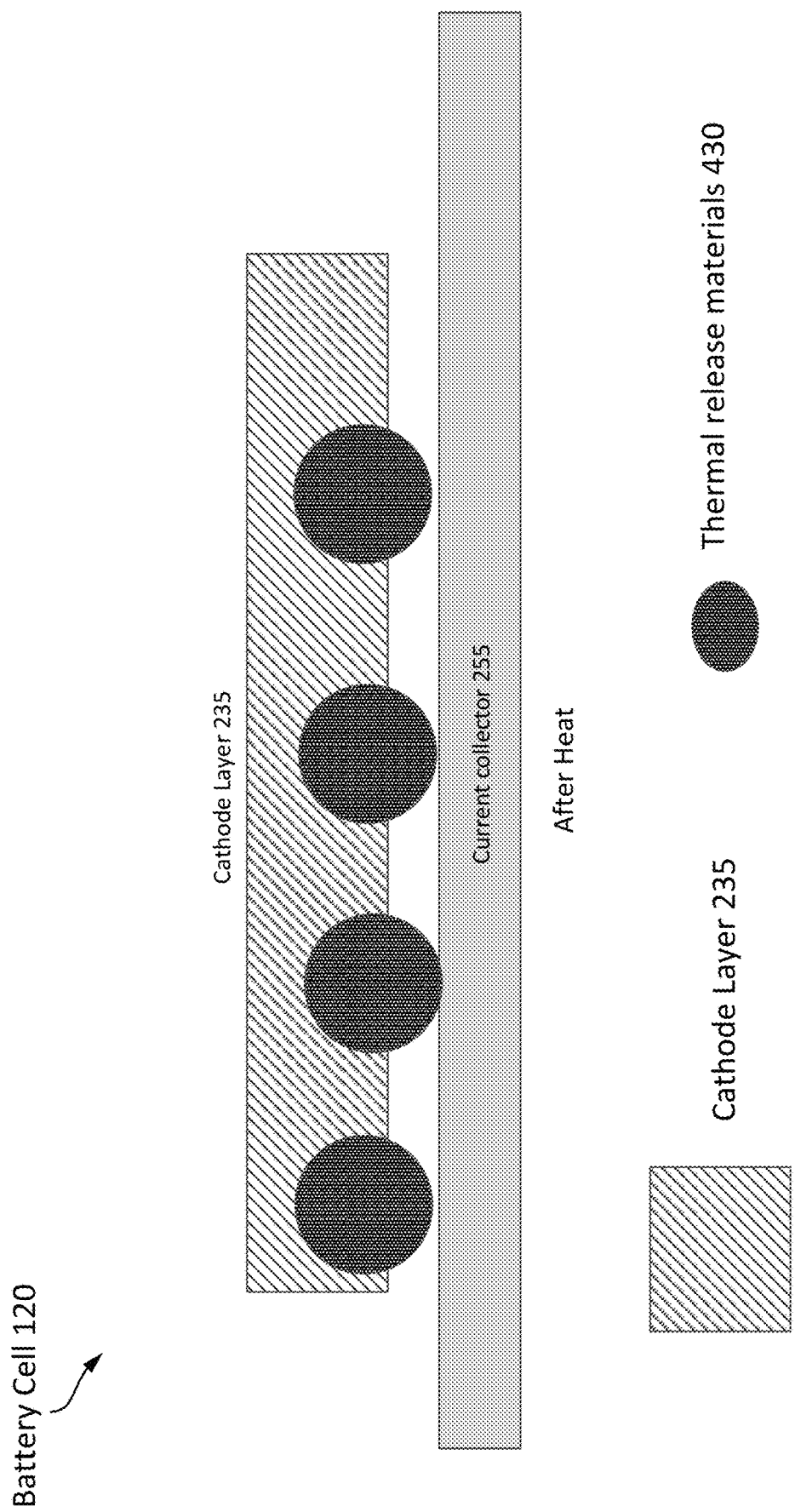
FIG. 7 depicts a cross sectional view of an example interface between a current collector and a cathode of a battery cell in which a layer of the thermal release materials is used after a thermal threshold is exceeded.

FIGS. 6 and 7, illustrate another example of a cathode layer 235 and current collector 255 interface before and after the thermal threshold has been reached or exceeded. In FIG. 6, a cathode layer 235 can include particles of the thermal release materials 430 forming a layer at or near the cathode layer 235 interface with the current collector 255. As the temperature of the thermal release materials have not reached the temperature threshold in the example in FIG. 6, the particles of the thermal release materials 430 have not expanded to the point where the electrical continuity has been reduced. As a result, in FIG. 6, cathode layer 235 and current collector 255 remain in electrical contact with each other. For example, the layer that includes thermal release materials 430 can also include other additives that provide desired electrical conductivity, such as conductive additives 440 (not shown). Alternatively, the surfaces of the cathode layer 235 and the current collector 255 can be roughened or include features that enable electrical continuity despite the layer of thermal release material 430 between them.

In the example of FIG. 7 once the thermal threshold has been exceeded, the layer of the thermal release material 430 at the cathode layer 235 can now be separated from the current collector 255 by the expanded thermal release materials 430 particles. The thermal release materials 430 can provide a gap between the current collector layer 255 and cathode layer 235, reducing the electrical continuity and increasing electrical resistance between the two layers.

For example, the battery cell 120 can provide a layer for the electrode (e.g. cathode layer 235 or anode layer 245) where the layer can be in electrical contact with the terminal, such as via a current collector. The layer can comprise the second material, in which at least a portion of the layer comprises an adhesive material to couple the terminal (via the current collector) and the electrode (e.g. cathode layer 235, anode layer 245) and responsive to the temperature of the second material exceeding the temperature threshold, the second material expands to decouple the electrode from the terminal to cause the reduction in the electrical continuity via the terminal. For example, the second material can include thermal release materials 430.

For example, a battery cell 120 can include a terminal that includes a current collector 255 and an electrode that can include a cathode, such as a cathode layer 235. The cathode layer 235 can include nickel material. The battery cell 120 can include the second material comprising a thermal release materials 430 comprising plurality of particles formed from plastic having a spherical shape that encapsulates a gas. The temperature threshold for the particles can be greater than or equal to about 200 degrees Celsius. The temperature threshold for the particles, can be varied, based on the material, so as to be greater than or equal to any one of 180 degree Celsius, 185 degree Celsius, 190 degree Celsius, 195 degree Celsius, 200 degree Celsius, 205 degree Celsius, 210 degree Celsius, 220 degree Celsius, 230 degree Celsius, 240 degree Celsius or 250 degree Celsius. The electrical continuity, prior to the temperature of the second material exceeding the temperature threshold, can corresponds to electrical resistance less than or equal to 0.1 ohms. The electrical resistance, depending on the design can vary, and be less than or equal to 0.01 ohms, 0.05 ohms, 0.1 ohms, 0.2 ohms, 0.3 ohms, 0.5 ohms, 0.7 ohms, 1 ohm, 2 ohms, 5 ohms or 10 ohms. The reduction in the electrical continuity subsequent to the temperature of the second material exceeding the temperature threshold can corresponds to an open circuit.

Figure 8:
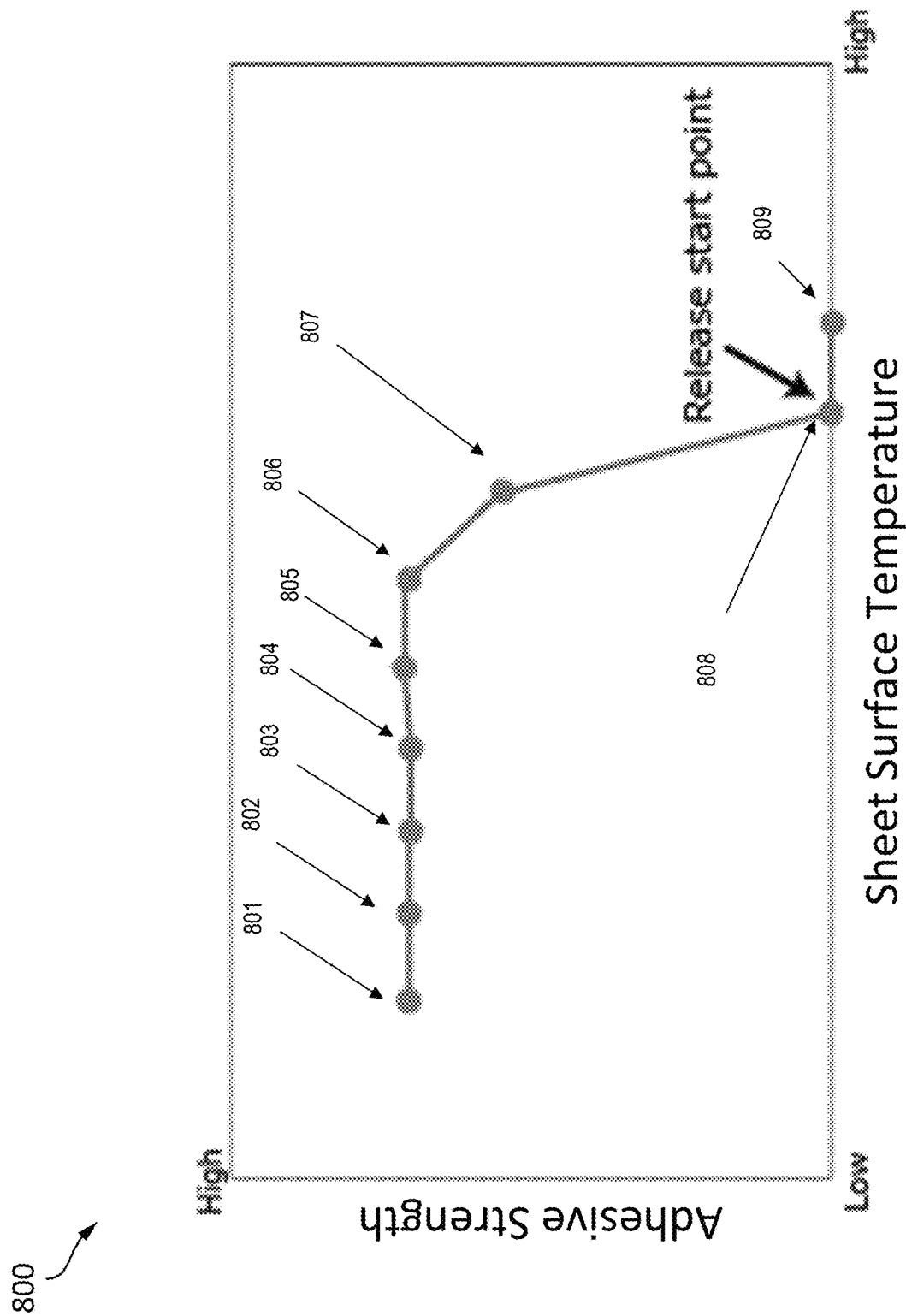
FIG. 8 depicts a graph of adhesive strength between an electrode and a collector terminal as a function of temperature.

FIG. 8 shows an example graph 800 of a series of measurements of sheet surface temperature versus adhesive strength, such as the adhesive strength between the cathode layer 235 and current collector 255 where binder 420 is used along with thermal release materials 430. The x-axis of the graph 800 shows "Sheet Surface Temperature" values going from low to high, while the y-axis shows "Adhesive Strength" going from low to high. While specific temperature and adhesive strength values can vary for different types of materials used, the graph shows nine measurement values, measurements 801, 802, 803, 804, 805, 806, 807, 808 and 809 indicating adhesive strength at lower and higher temperatures on the graph 800. The first six adhesive strength values (e.g. 801-806) are relatively even in terms of adhesive strength, as the adhesive strength remains high as the temperature is increasing, but remains lower than the threshold temperature. However, as the temperature increases, measurement 807 shows the adhesive strength starting to decrease. At measurement 808, the adhesive strength is zero and remains zero at measurement 809. The graph, therefore, shows the adhesive strength falling once a thermal threshold has been reached or exceeded. Accordingly, when an adhesive layer comprising binder 420 and thermal release materials 430 is used, the adhesive strength can remain strong until the thermal release materials 430 reach their thermal threshold. After the threshold is reached and then exceeded, the adhesive strength can be severely reduced and go down to zero.

Figure 9:
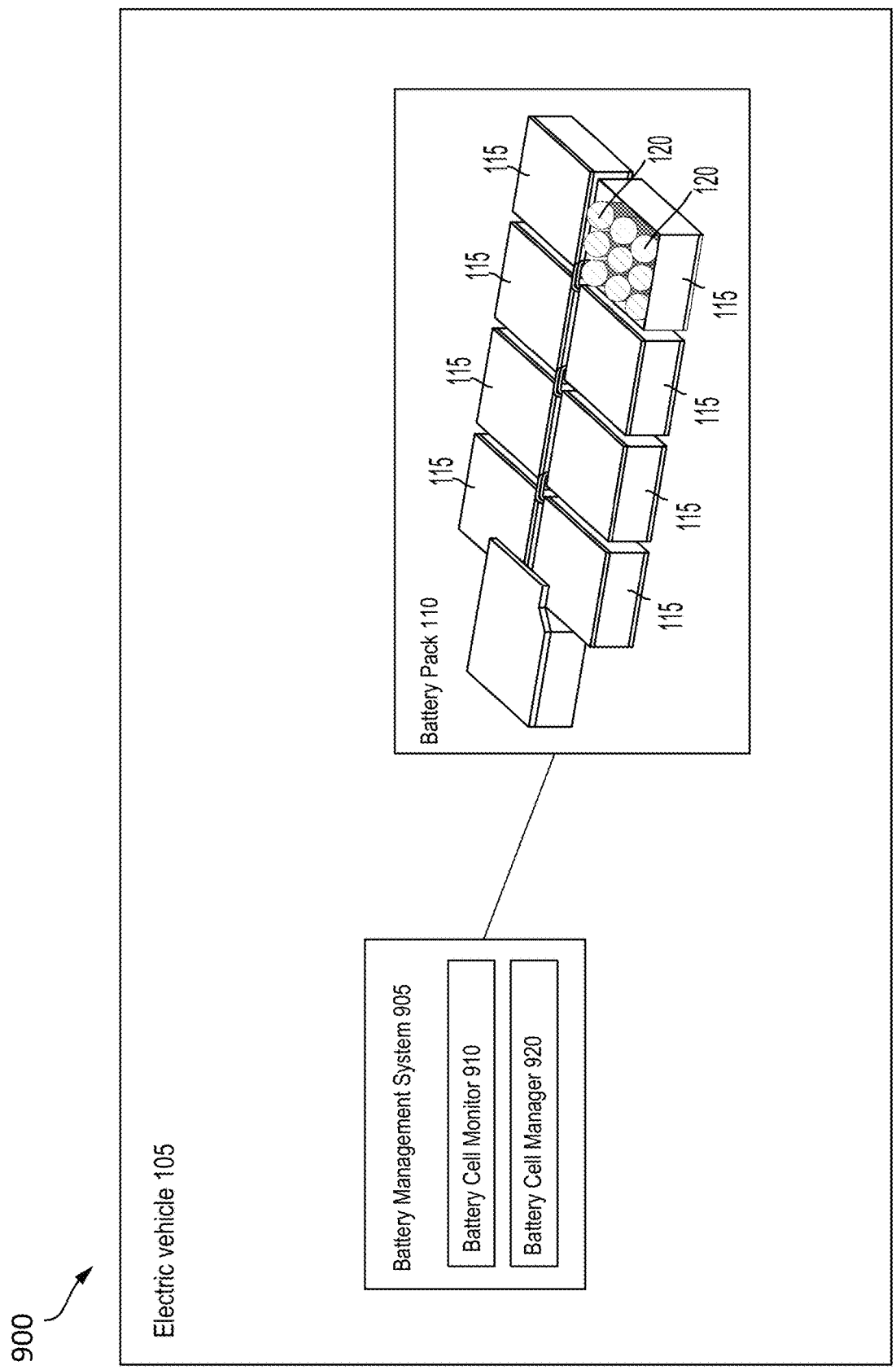
FIG. 9 depicts an example for managing a battery deployed in an electric vehicle.

FIG. 9 shows an example of a system 900 for managing battery cell operation in an electric vehicle 105. System 900 includes a battery management system 905 operating on an electric vehicle 105. The battery management system 905 can include a battery cell monitor 910 and a battery cell manager 920. The battery management system 905 can be in communication with the battery pack 110 that can include one or more battery modules 115, each one of which can include one or more battery cells 120. The battery management system 905 can monitor and control the operation of each one or more of the battery pack 110, battery modules 115 and battery cells 120.

Battery management system 905 can include any hardware or software for monitoring and managing the operation of the battery pack 110, battery modules 115 and battery cells 120. The battery management system 905 can include functions, scripts, computer code or programs for monitoring electrical resistance or electrical continuity at the battery cells 120 and managing the amount of current that can be provided by any battery pack 110, battery module 115 and battery cell 120. The battery management system 905 can be included in a battery pack 110. The battery management system 905 can operate on or include any functionality or features of a computing device 300. Battery management system 905 can include functions for monitoring or managing battery cells 120.

A battery cell monitor 910 can include any hardware or software for monitoring and measuring the operation of the battery cells 120. The battery cell monitor 910 can include functions, scripts, computer code or programs for monitoring electrical resistance or electrical continuity at any one or more battery cells 120 across any battery modules 115 or battery packs 110. The battery cell monitor 910 can operate on a computing device 300 and can include any functionality of a computing device 300. Battery cell monitor 910 can include functions for monitoring battery cells, determining their electrical resistance and determining if their internal components are in electrical continuity and to what degree. Battery cell monitor 910 can determine if a battery cell 120 is decoupled, or if a cathode layer 235 of the battery cell 120 has separated from a current collector 255. For example, the battery cell monitor 910 can measure the resistance of the battery cell 120. The battery cell monitor 910 can compare the resistance with a threshold resistance. If the resistance of the battery cell 120 exceeds the threshold resistance, then the battery cell monitor 910 can determine that the cathode layer 235 has decoupled from the current collector 255. The battery cell monitor 910 can determine that the cathode layer 235 decoupled, delaminated or otherwise detached from the current collector 255 responsive to the thermal release layer 430 expanding based on the temperature of the thermal release layer 430 reaching or exceeding a temperature threshold. In some cases, the battery cell monitor 910 can provide a notification or indication of the decoupling event. The battery cell monitor 910 can provide a visual notification, an auditory notification, or a haptic notification, for example. In some cases, the battery cell monitor 910 can provide the notification via a display device of the electric vehicle, such as a vehicle dashboard. In some cases, the battery cell monitor 910 can provide the notification via a communications network, such as a cell network, to a remote computing device or system.

A battery cell manager 920 can include any hardware or software for managing or controlling the operation of the battery cells 120. The battery cell manager 920 can include functions, scripts, computer code or programs for managing or controlling the amount of current provided by an individual battery cell 120 across any battery modules 115 or battery packs 110. The battery cell manager 920 can manage operation of a battery cell responsive to information gathered or determined by battery cell monitor. Battery cell manager 920 can operate on a computing device 300 and can include any functionality of a computing device 300.

Battery management system 905 along with battery cell monitor 910 and battery cell manager 920 can be executed on one or more processors, such as the processors of a computing device 300. The battery cell monitor 910 can determine if resistance in a battery cell 120 has increased. The battery cell monitor 910 can determine, based on the increase of the resistance, an occurrence of a decoupling event at a first battery cell 120. The battery cell manager 920 can manage the amount of current provided via a second battery cell 120 responsive to the determination that the occurrence of the decoupling event at first battery cell.

For example, an electric vehicle can include a battery cell 120 comprising a current collector 255 connected to a positive terminal (e.g. 225 or 230) and a cathode (e.g. 235) in contact with the current collector 255. The current collector 255 can comprise a first material (e.g. 410 or 440) that conducts electricity to establish electrical continuity with the current collector 255, and a second material that, in response to a temperature of the cathode (e.g. 235) exceeding a temperature threshold, expands at a greater rate than the first material to decouple the cathode (e.g. 235) from the current collector 255 and increase a resistance of the battery cell 120. The electric vehicle 105 can include a battery management system 905, executed by one or more processors, that determines, based on the increase of the resistance of the battery cell, an occurrence of a decoupling event at the battery cell 120. The electric vehicle 105 can include a battery pack 110 comprising multiple battery cells 120, the multiple battery cells 120 including the battery cell 120 and a second battery cell 120. The battery management system 905 can manage an amount of current provided via the second battery cell 120 responsive to the determination of the occurrence of the decoupling event at the battery cell 120.

Figure 10:
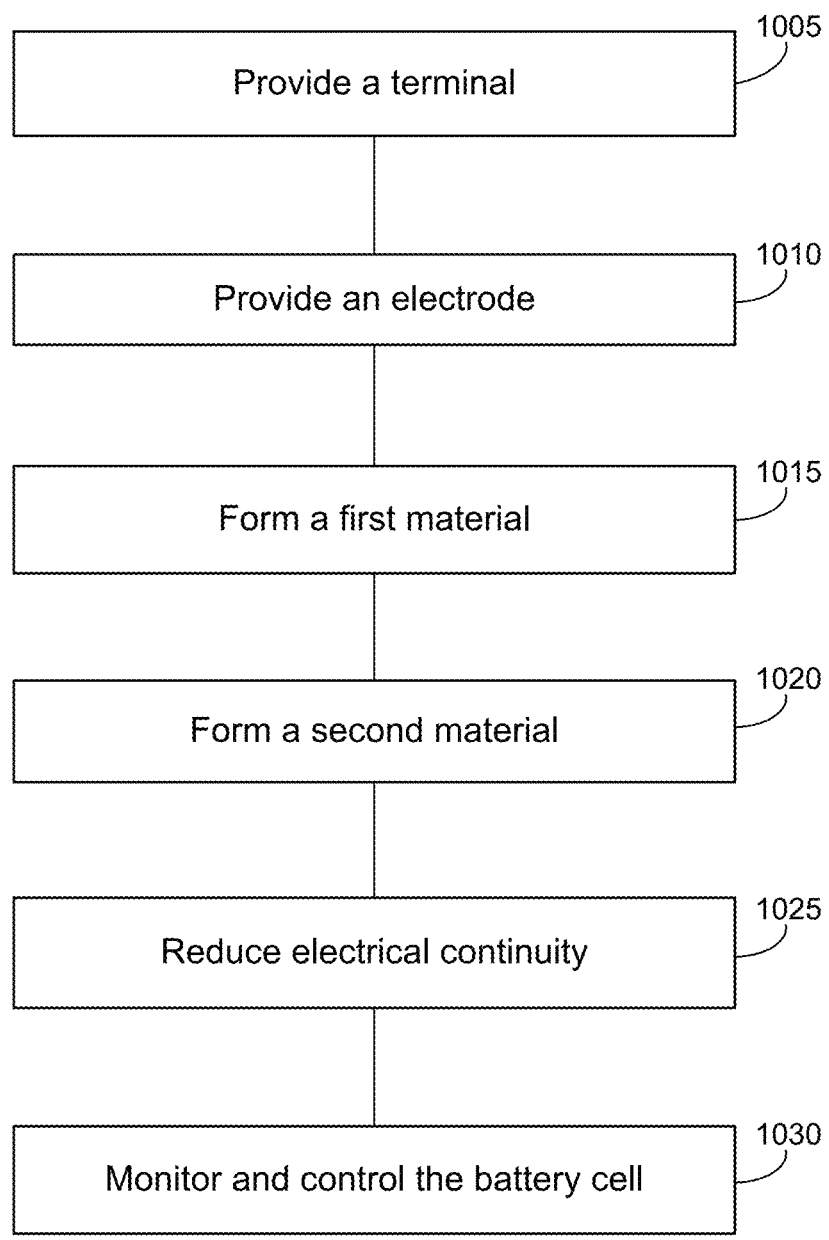
FIG. 10 depicts an example method for providing a thermal release layer for an electrode of a battery in accordance with implementations.

FIG. 10 illustrates an example method 1000. The method 1000 can be implemented by an electric vehicle 105 or battery pack 110 and can include acts 1005 through 1030. The method can include providing a terminal at ACT 1005. At ACT 1010, an electrode can be provided. At ACT 1015, a first material can be formed. At ACT 1020, a second material can be formed. The method can include reducing electrical conductivity at ACT 1025. At ACT 1030, a battery management system ("BMS") can monitor and control the battery cells.

At ACT 1005 a terminal can be provided. The terminal can be a terminal for a battery cell. The terminal can be a positive or a negative terminal. The terminal can be connected to an external device using the battery cell as a power source. The terminal can be electrically connected to an anode of the battery cell. The terminal can be electrically connected to a cathode of the battery cell. The terminal can be provided by a battery pack or a battery module. The terminal can be provided by an electric vehicle. The terminal can be provided as a part of a battery cell of an electrical or electronic device.

At ACT 1010, an electrode can be provided. The electrode can be in contact with the terminal. The electrode can be in a physical contact with the terminal. The electrode can be in an electrical contact with the terminal. An electrode can include a cathode, such as a cathode layer 235. An electrode can include an anode, such as an anode layer 245. The electrode can include one or more cathode materials 410. The electrode can include one or more binders or adhesive materials 420. The electrode can include one or more thermal release materials 430. The electrode can include one or more conductive additives 440. The electrode can include an electrically conductive material, such as a sheet or a portion of a metal, including for example aluminum, copper, nickel, titanium, stainless steel or carbonaceous materials. The electrode can include thermal release materials 430 provided on the outer surface of the electrode. The thermal release materials of the electrode can be mixed with adhesive and form an adhesive layer. The electrode can be provided by a battery pack or a battery module. The electrode can be provided by an electric vehicle. The electrode can be provided as a part of a battery cell of an electrical or electronic device. The method can include an act of binding the electrode with the terminal using an adhesive.

At ACT 1015, a first material can be formed. The first material can conduct electricity to establish electrical continuity with the terminal. The first material can include an electrically conductive material. The first material can include a material conducting electricity through the electrode. The first material can include any one or more cathode materials 410. The first material can include any one or more conductive additives 440. The first material can include any one or more binders 420. The first material can include a sheet of metal or a thermally conductive material, such as for example aluminum, copper, nickel, titanium, stainless steel or carbonaceous materials. The first material can be formed as a mix or aggregation of various materials. The electrode can be bound with the terminal using an adhesive.

At ACT 1020, a second material can be formed. The second material can, in response to a temperature of the electrode exceeding a temperature threshold, expand to reduce the electrical continuity with the terminal. The second material can be included in the electrode. The second material can include a thermal release material. The thermal release material can be electrically insulating. Thermal release material can include any thermal release materials 430 discussed herein. For example, thermal release material can include thermally expandable spheroidal particles, such as thermally expandable microspheres. The microspheres can include a shell, such as a plastic or a polymer shell that can encapsulate a gas, which can expand the volume of the microsphere when heated. The thermal release material microspheres can increase their volume by anywhere between 5 and 50 times, such as for example more than 5, 10, 15, 20, 25, 30, 35, 40, 45 or 50 times with respect to their original volume size at the baseline temperature. The microspheres can increase their volume as much as, or more than, other materials in the cathode layer 235, such as the cathode materials 410, binder 420 or conductive additives 440. The microspheres can increase their volume at a rate that is greater than the rate at which cathode materials 410, binder 420 or conductive additives 440 increase their volume for the same temperature increase. The microspheres can increase their volume by anywhere between 5 and 50 times more than other cathode layer 235 materials, such as more than 5, 10, 15, 20, 25, 30, 35, 40, 45 or 50 times.

Thermal release materials 430 can include material can be formed so as to expand at a greater rate than the adhesive at the temperature threshold. For example, the terminal and the electrode can be electrically coupled via adhesion using a component to establish electrical continuity. The component can include a portion of the terminal overlapping over the electrode or a portion of the electrode overlapping over the terminal. The component can include a piece of material overlapping both electrode and terminal. The component can provide a layer for the electrode, the layer can be in contact with the component and comprising the second material configured to decouple the electrode from the component at the temperature threshold. Decoupling the electrode from the component can include delaminating the electrode and the component. A layer for the electrode can be provided, where the layer is in electrical contact with the terminal and comprising the second material, in which at least a portion of the layer comprises an adhesive material to couple the terminal and the electrode, and responsive to the temperature of the second material exceeding the temperature threshold, the second material expands to decouple the electrode from the terminal to cause the reduction in the electrical continuity via the terminal.

At ACT 1025, electrical continuity can be reduced. Electrical continuity between the electrode and the terminal can be reduced in response to a thermal threshold being exceeded. Electrical conductivity or electrical continuity between a cathode and a current collector can be reduced or severed in response to a thermal threshold for the thermal release material being exceeded. For example, electrical conductivity between an anode and a current collector can be reduced in response to a thermal threshold for the thermal release material being exceeded. When microspheres of a thermal release material reach or exceed the threshold temperature, depending on the material, the microspheres can expand by a factor of 5, 10, 20, 30, 40, 50 or more times than their original volume at a baseline temperature. In response to exceeding their thermal threshold, the particles of the thermal release material can form a foam. The foam can be formed by particles of the thermal release materials 430 expanding and remaining expanded microspheres with a larger volume size. The foam can be formed by microspheres bursting and releasing layers of materials to the surrounding area. The foam created can separate or delaminate the electrically conductive portions of an electrode and the current collector (e.g. or any other component electrically connected to the terminal to which the electrode is electrically coupled).

For example in response to exceeding thermal threshold, the microspheres of thermal release material can expand and remain expanded, creating a separation between the electrode (e.g. cathode or anode) and the terminal or its electrically connected current collector. The thermal threshold can be a single temperature threshold or a range of temperatures. For example, a thermal threshold can be a temperature range of 194-206° C. The thermal threshold can be any temperature between 100° C. and 250° C., including for example 150° C., 160° C., 170° C., 180° C., 190° C., 200° C., 210° C., 220° C., 230° C., 240° C., 250° C., 260° C. or more.

The method can include an act of providing a layer for the electrode. The layer can be in contact with the terminal and include the second material. At least a portion of a layer in electrical contact in terminal can include an adhesive material to couple the terminal and the electrode. Responsive to the temperature of the second material exceeding the temperature threshold, the second material can expand to decouple the electrode from the terminal. Decoupling can cause the reduction in the electrical continuity via the terminal. The method can include an act of the second material delaminating the electrode from the component.

The method can include an act of the second material expanding to decouple the electrode from the terminal to cause the reduction in the electrical continuity via the terminal. The terminal can include a current collector of the battery. The electrode can include a cathode comprising nickel. The second material can include particles formed from plastic or polymer having a spherical shape that encapsulates a gas. The temperature threshold can be greater than or equal to 200 degrees Celsius. The electrical continuity, prior to the temperature of the second material exceeding the temperature threshold, can correspond to electrical resistance of less than or equal to 0.1 ohms. The reduction in the electrical continuity subsequent to the temperature of the second material exceeding the temperature threshold can correspond to an open circuit. The method can include an act of providing a battery cell that includes the terminal and the electrode. The battery cell can be included in a battery pack of a vehicle.

At ACT 1030, a battery management system ("BMS") can monitor and control the battery cells. The BMS can be a BMS of an electric vehicle, or any other electrical device whose battery cells are monitored and managed electronically. A BMS can monitor operation of one or more battery cells, battery modules and battery packs. When a continuity across an electrode of a battery cell is reduced or severed, the BMS can detect the increase of the electrical resistance, or decrease of electrical continuity. The BMS can determine, based on the increase of the resistance of the battery cell, that a decoupling or detaching of a battery cell has occurred. The BMS can identify the battery cell, the battery module and the battery pack at which the decoupling has occurred. The BMS can manage an amount of current provided to the identified battery cell. The BMS can identify a second battery cell (e.g. a different battery cell than the one at which decoupling was detected) and manage the amount of current provided via the via the second battery cell responsive to the determination of the occurrence of the decoupling event at the identified battery cell. The BMS can increase the amount of current provided via the second battery cell in response to the determination that the occurrence at the first battery cell has occurred or in response to a determination that the decoupling at the second battery cell has not occurred. The BMS can manage multiple battery cells at which the decoupling has not occurred to provide additional current and compensate for the current not provided by the battery call at which the decoupling was detected.

The electric vehicle can include a battery pack. The battery pack can include a plurality of battery cells. The battery cells can include the battery cell and a second battery cell. The battery management system can manage an amount of current provided via the second battery cell responsive to the determination of the occurrence of the decoupling event at the battery cell.

Figure 11:
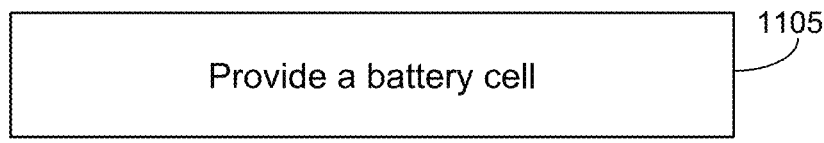
FIG. 11 depicts an example method for providing a battery cell including a thermal release layer in accordance with implementations.

FIG. 11 illustrates an example method 1100. The method 1100 can include an ACT 1105 of providing a battery cell. The battery cell can include a terminal and an electrode. The electrode can be in contact with the terminal. The contact between the electrode and the terminal can include an electrical contact. The electrode can include a first material that conducts electricity to establish electrical continuity with the terminal. The electrode can include a second material. The second material can, in response to a temperature of the electrode exceeding a temperature threshold, expand to reduce the electrical continuity with the terminal.

The terminal can be in electrical contact with a current collector. The electrode can be in a physical contact with the current collector. The electrode can include a cathode. The cathode can include nickel. The first material can establish electrical continuity with the terminal by maintaining a physical contact with the current collector that is in electrical contact with the terminal. The second material can expand more than the first material. The second material can create a space, a gap or a foam between the first material and the current collector or the terminal. The electrical continuity between the electrode (e.g. cathode) and the terminal (e.g. current collector) can be reduced or severed in response to the second material expanding more than the first material. The electrical continuity can be reduced or severed in response to the second material creating a gap between the first material of the cathode and the current collector.

Some of the description herein emphasizes the structural independence of the aspects of the system components or groupings of operations and responsibilities of these system components. Other groupings that execute similar overall operations are within the scope of the present application. Modules can be implemented in hardware or as computer instructions on a non-transient computer readable storage medium, and modules can be distributed across various hardware or computer based components.

The systems described above can provide multiple ones of any or each of those components and these components can be provided on either a standalone system or on multiple instantiation in a distributed system. In addition, the systems and methods described above can be provided as one or more computer-readable programs or executable instructions embodied on or in one or more articles of manufacture. The article of manufacture can be cloud storage, a hard disk, a CD-ROM, a flash memory card, a PROM, a RAM, a ROM, or a magnetic tape. In general, the computer-readable programs can be implemented in any programming language, such as LISP, PERL, C, C++, C #, PROLOG, or in any byte code language such as JAVA. The software programs or executable instructions can be stored on or in one or more articles of manufacture as object code.

Example and non-limiting module implementation elements include sensors providing any value determined herein, sensors providing any value that is a precursor to a value determined herein, datalink or network hardware including communication chips, oscillating crystals, communication links, cables, twisted pair wiring, coaxial wiring, shielded wiring, transmitters, receivers, or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), or digital control elements.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices include cloud storage). The operations described in this specification can be implemented as operations performed by a data processing apparatus on data stored on one or more computer-readable storage devices or received from other sources.

The terms "computing device", "component" or "data processing apparatus" or the like encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

For example, descriptions of positive and negative electrical characteristics may be reversed. Elements described as negative elements can instead be configured as positive elements and elements described as positive elements can instead by configured as negative elements. For example, elements described as having first polarity can instead have a second polarity, and elements described as having a second polarity can instead have a first polarity. Further relative parallel, perpendicular, vertical or other positioning or orientation descriptions include variations within +/−10% or +/−10 degrees of pure vertical, parallel or perpendicular positioning. References to "approximately," "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. A battery cell, comprising:
a terminal; and
an electrode, in contact with the terminal, comprising:
  a first material that conducts electricity to establish electrical continuity with the terminal, and
  a second material that, in response to a temperature of the electrode exceeding a temperature threshold, expands to reduce the electrical continuity with the terminal, wherein at least a portion of a layer in electrical contact with the terminal comprises an adhesive material to couple the terminal and the electrode, and responsive to the temperature of the second material exceeding the temperature threshold, the second material expands to decouple the electrode from the terminal by generating foam to cause a reduction in the electrical continuity via the terminal.

2. The battery cell of claim 1, comprising:
an adhesive configured to bind the electrode to a current collector in electrical contact with the terminal, wherein the second material expands at a greater rate than the adhesive at the temperature threshold.

3. The battery cell of claim 1, comprising:
a component that couples the terminal and the electrode via adhesion to establish the electrical continuity.

4. The battery cell of claim 3, wherein the electrode comprises the layer in contact with the component, the layer comprising the second material and configured to decouple the electrode from the component at the temperature threshold.

5. The battery cell of claim 1, wherein the electrode comprises the layer in electrical contact with the terminal, the layer comprising the second material that expands at a greater rate than the first material.

6. The battery cell of claim 1, wherein the terminal comprises a current collector of the battery cell and the electrode comprises a cathode comprising nickel.

7. The battery cell of claim 1, comprising:
a plurality of electrodes each comprising the second material and in electrical contact with the terminal, wherein electrical continuity of a first electrode of the plurality of electrodes is reduced responsive to the temperature of the second material at the first electrode exceeding the temperature threshold, and electrical continuity of a second electrode of the plurality of electrodes is maintained based on the temperature of the second material at the second electrode being less than the temperature threshold.

8. The battery cell of claim 1, wherein:
the temperature threshold is greater than or equal to 200 degrees Celsius;
the electrical continuity, prior to the temperature of the second material exceeding the temperature threshold, corresponds to electrical resistance less than or equal to 0.1 ohms; and
the reduction in the electrical continuity subsequent to the temperature of the second material exceeding the temperature threshold corresponds to an open circuit.

9. The battery cell of claim 1, comprising:
the battery cell comprising the terminal and the electrode, wherein the battery cell is included in a battery pack of a vehicle.

10. The battery cell of claim 1, wherein the second material comprises:
a plurality of particles formed from plastic having a shape that is spheroidal and encapsulates a gas.

11. The battery cell of claim 10, wherein the gas expands at the temperature threshold to cause an increase in volume of each of the plurality of particles by at least a factor of 5.

12. A method, comprising:
providing a terminal for a battery; and
forming, for the battery, an electrode in contact with the terminal from:
a first material that conducts electricity to establish electrical continuity with the terminal, and
a second material that, in response to a temperature of the electrode exceeding a temperature threshold, expands to reduce the electrical continuity with the terminal, wherein at least a portion of a layer in electrical contact with the terminal comprises an adhesive material to couple the terminal and the electrode, and responsive to the temperature of the second material exceeding the temperature threshold, the second material expands to decouple the electrode from the terminal by generating foam to cause a reduction in the electrical continuity via the terminal.

13. The method of claim 12, comprising:
binding the electrode with the terminal using an adhesive, wherein the second material expands at a greater rate than the adhesive at the temperature threshold.

14. The method of claim 12, comprising:
electrically coupling, via adhesion, the terminal and the electrode using a component to establish the electrical continuity; and
providing the layer for the electrode, the layer in contact with the component and comprising the second material configured to decouple the electrode from the component at the temperature threshold.

15. The method of claim 12, wherein:
the terminal comprises a current collector of the battery and the electrode comprises a cathode comprising nickel;
the second material comprises a plurality of particles formed from plastic having a spherical shape that encapsulates a gas;
the temperature threshold is greater than or equal to 200 degrees Celsius;
the electrical continuity, prior to the temperature of the second material exceeding the temperature threshold, corresponds to electrical resistance less than or equal to 0.1 ohms; and
the reduction in the electrical continuity subsequent to the temperature of the second material exceeding the temperature threshold corresponds to an open circuit.

16. The method of claim 12, comprising:
providing a battery cell comprising the terminal and the electrode, wherein the battery cell is included in a battery pack of a vehicle.

17. An electric vehicle, comprising:
a battery cell comprising:
a current collector connected to a positive terminal; and
a cathode, in contact with the current collector, comprising:
a first material that conducts electricity to establish electrical continuity with the current collector, and
a second material that, in response to a temperature of the cathode exceeding a temperature threshold, expands at a greater rate than the first material to decouple the cathode from the current collector and results in an increase of a resistance of the battery cell, wherein at least a portion of a layer in electrical contact with the positive terminal comprises an adhesive material to couple the positive terminal and the cathode, and responsive to the temperature of the second material exceeding the temperature threshold, the second material expands to decouple the cathode from the positive terminal by generating foam to cause a reduction in the electrical continuity via the positive terminal; and
a battery management system, executed by one or more processors, to:
determine, based on the increase of the resistance of the battery cell, an occurrence of a decoupling event at the battery cell.

18. The electric vehicle of claim 17, comprising:
a battery pack comprising a plurality of battery cells, the plurality of battery cells comprising the battery cell and a second battery cell; and
the battery management system to manage an amount of current provided via the second battery cell responsive to determination of the occurrence of the decoupling event at the battery cell.

\* \* \* \* \*